US008887500B2

(12) United States Patent
Kanenobu et al.

(10) Patent No.: US 8,887,500 B2
(45) Date of Patent: Nov. 18, 2014

(54) HYDRAULIC TRANSAXLE

(75) Inventors: Hideki Kanenobu, Amagasaki (JP);
Masaru Iida, Amagasaki (JP); Koji Iwaki, Amagasaki (JP); Shinya Sakakura, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 455 days.

(21) Appl. No.: 13/421,172

(22) Filed: Mar. 15, 2012

(65) Prior Publication Data
US 2013/0239561 A1  Sep. 19, 2013

(51) Int. Cl.
*F16D 31/02* (2006.01)

(52) U.S. Cl.
USPC .................................. 60/488; 60/486; 60/487

(58) Field of Classification Search
USPC ........................................... 60/486, 487, 488
See application file for complete search history.

(56) References Cited

U.S. PATENT DOCUMENTS

| RE36,807 | E  * | 8/2000  | Okada ............................ 60/488 |
| 6,571,894 | B2 * | 6/2003  | Ishimaru et al. ................ 60/486 |
| 6,802,183 | B2 * | 10/2004 | Ishimaru et al. ................ 60/488 |
| 7,275,372 | B2 * | 10/2007 | Ishimaru et al. ................ 60/488 |
| 7,654,083 | B2 * | 2/2010  | Iida et al. ........................ 60/487 |
| 7,730,705 | B2   | 6/2010  | Kubinski |
| 7,866,152 | B2 * | 1/2011  | Iida ................................ 60/487 |
| 2011/0162355 | A1 | 7/2011 | Hardzinski |

FOREIGN PATENT DOCUMENTS

JP    H02-051763 U    4/1990

* cited by examiner

*Primary Examiner* — Michael Leslie
(74) *Attorney, Agent, or Firm* — Sterne, Kessler, Goldstein & Fox, P.L.L.C.

(57) ABSTRACT

A hydraulic transaxle comprises a transaxle housing, an axle, a hydraulic pump, a hydraulic motor, a hydraulic circuit, and a pair of auxiliary pumps. The transaxle housing defines a fluid sump therein. The axle is supported by the transaxle housing. The hydraulic motor is disposed in the transaxle housing so as to drive the axle. The hydraulic pump is disposed in the transaxle housing so as to supply hydraulic fluid to the hydraulic motor. The hydraulic circuit is disposed in the transaxle housing so as to fluidly connect the hydraulic pump to the hydraulic motor. The pair of auxiliary pumps are disposed in the transaxle housing so as to supply fluid from the fluid sump to outside of the transaxle housing.

13 Claims, 20 Drawing Sheets

HYDRAULIC TRANSAXLE

BACKGROUND OF THE INVENTION

1. Field of the Invention

The present invention relates to a hydraulic transaxle adaptable to a vehicle, e.g., a lawn mower, equipped with a hydraulic actuator, e.g., a device for lifting a mower deck.

2. Related Art

A lawn mower is equipped with a lift mechanism for raising and lowering a mower deck. A typical lift mechanism is manually operated to adjust a height of a mower deck. Further, there is a conventional lawn mower equipped with an automatic mower-deck lifting unit, as disclosed by U.S. Pat. No. 7,730,705 B2. This unit integrally includes a hydraulic actuator (hydraulic cylinder) for raising and lowering a mower deck, a hydraulic pump for supplying fluid to the hydraulic actuator, and an electric motor for driving the hydraulic pump. This unit is mounted on a vehicle frame of the lawn mower, and a piston rod of the hydraulic actuator is connected to a linkage suspending the mower deck.

Further, there is a conventional hydraulic zero-turn vehicle driving system, as disclosed by US 2011/0162355 A1. This system includes right and left hydraulic transaxles carrying respective right and left axles. The right and left hydraulic transaxles include respective transaxle housings separated from each other, and each of the transaxle housings incorporates a hydrostatic stepless transmission (hereinafter, HST) for driving the corresponding axle. This reference discloses an embodiment in which a charge pump in one transaxle housing supplies fluid from a fluid sump in this transaxle housing to the HST in the other transaxle housing.

Further, there is a conventional hydraulic transaxle as disclosed by JP H02-51763 U. This hydraulic transaxle includes a transaxle housing that incorporates a differential unit supporting right and left axles, and an HST for driving the differential unit. This transaxle housing further incorporates a trochoidal pump serving as a charge pump for supplying fluid from a fluid sump in the transaxle housing to the HST, and incorporates another trochoidal pump for supplying fluid to a hydraulic actuator disposed outside of the transaxle housing to lift a mower deck so as to effect radiating heat from fluid when flowing in a pipe between the transaxle housings.

If an electric-hydraulic mower-deck lifting unit such as disclosed by U.S. Pat. No. 7,730,705 B2 were equipped on a lawn mower with a hydraulic zero-turn vehicle driving system including right and left hydraulic transaxles such as disclosed by US 2011/0162355 A1, the mower-deck lifting unit would occupy a large space outside of the right and left transaxles so as to provide an insufficient ground clearance to the lawn mower.

JP H02-51763 U suggests that a hydraulic transaxle incorporates a hydraulic pump for supplying fluid to a hydraulic actuator for lifting a mower deck. However, this transaxle, including the differential unit supporting the right and left axles, is not a zero-turn vehicle driving system including right and left separate transaxles. The charge pump of this transaxle supplies fluid to the HST in its own transaxle housing, and cannot supply fluid outward from the transaxle housing.

As a result, there is no conventional hydraulic transaxle adaptable to a hydraulic zero-turn vehicle driving system for a vehicle, e.g., a lawn mower, which is available to effectively radiate heat from fluid, and which is also available to operate a hydraulic actuator disposed outside of the hydraulic transaxle, e.g., a hydraulic actuator for raising and lowering a mower deck.

BRIEF SUMMARY OF THE INVENTION

An object of the invention is to provide an available hydraulic transaxle, which is adaptable to a hydraulic zero-turn vehicle driving system for a vehicle, e.g., a lawn mower, and which is adaptable for operating a hydraulic actuator disposed outside of the hydraulic transaxle, e.g., a hydraulic actuator for raising and lowering a mower deck.

To achieve this object, a hydraulic transaxle comprises a transaxle housing, an axle, a hydraulic motor, a hydraulic pump, a hydraulic circuit, and a pair of auxiliary pumps. The transaxle housing defines a fluid sump therein. The axle is supported by the transaxle housing. The hydraulic motor is disposed in the transaxle housing so as to drive the axle. The hydraulic pump is disposed in the transaxle housing so as to supply hydraulic fluid to the hydraulic motor. The hydraulic circuit is disposed in the transaxle housing so as to fluidly connect the hydraulic pump to the hydraulic motor. The pair of auxiliary pumps are disposed in the transaxle housing so as to supply fluid from the fluid sump to outside of the transaxle housing. Therefore, this transaxle is advantageous because it can provide two ports for supplying respective hydraulic equipment disposed outside of this transaxle housing with fluid delivered from the respective auxiliary pumps when it serves as one of right and left transaxles in a hydraulic zero-turn vehicle driving system.

Preferably, the hydraulic transaxle serves as a first hydraulic transaxle. One of the auxiliary pumps serves as a charge pump for supplying fluid from the fluid sump in the transaxle housing of the first hydraulic transaxle into a transaxle housing of a second hydraulic transaxle. The other of the auxiliary pumps serves as an actuator pump for supplying fluid from the fluid sump in the transaxle housing of the first hydraulic transaxle to a hydraulic actuator disposed outside of the transaxle housings of the first and second hydraulic transaxles. Therefore, when this hydraulic transaxle serves as one of right and left hydraulic transaxles of a hydraulic zero-turn vehicle driving system equipped on a vehicle having the hydraulic actuator, this hydraulic transaxle advantageously supplies fluid to the partner hydraulic transaxle so as to effect radiating heat from the fluid, and also advantageously incorporates the actuator pump for supplying fluid to the hydraulic actuator so as to ensure a sufficiently large space outside of the right and left hydraulic transaxles.

Preferably, a vehicle is equipped with the first and second hydraulic transaxles and a mower deck, and the hydraulic actuator is provided for lifting the mower deck. Therefore, an additional hydraulic or electric motor does not have to be arranged in a limited narrow space outside of the mower deck and right and left transaxles.

Preferably, a hydraulic valve is disposed outside of the transaxle housings of the first and second hydraulic transaxles so as to fluidly connect the hydraulic actuator to the actuator pump. Therefore, the hydraulic transaxle separated from the hydraulic valve is simplified so as to reduce costs.

Preferably, the transaxle housing of the second hydraulic transaxle defines a fluid sump therein, and the hydraulic valve is fluidly connected to the fluid sump in the transaxle housing of the second hydraulic transaxle. Therefore, fluid flows from the transaxle housing of the first hydraulic transaxle to the fluid sump in the transaxle housing of the second hydraulic transaxle via the hydraulic valve so as to promote radiation of heat from fluid flowing in a passage outside of the transaxle housings of the first and second hydraulic transaxles.

Preferably, the hydraulic transaxle further comprises a pump housing supporting the auxiliary pumps. The pump housing includes a suction duct and a pair of delivery ducts.

The pump housing is disposed in the transaxle housing so as to supply fluid from the fluid sump to the auxiliary pumps via the suction duct, and so as to deliver fluid from the auxiliary pumps to the outside of the transaxle housing via the respective delivery ducts. Therefore, the pump housing functions as a common suction port for the two auxiliary pumps and as delivery ports for the respective auxiliary pumps, thereby reducing the number of parts.

Preferably, the suction duct serves as a first suction duct, and the pump housing has a second suction duct fluidly connected to the hydraulic circuit so as to supply fluid from the outside of the transaxle housing to the hydraulic circuit. Therefore, the pump housing functions as a suction port for absorbing fluid from the fluid sump in the transaxle housing, and also functions as another suction port for receiving fluid from the outside of the transaxle housing so as to supply fluid to the hydraulic circuit, thereby reducing the number of parts.

Preferably, the hydraulic transaxle serves as a first hydraulic transaxle. One of the auxiliary pumps serves as a charge pump for supplying fluid from the fluid sump in the transaxle housing of the first hydraulic transaxle into a transaxle housing of a second hydraulic transaxle via one of the delivery ducts. The other of the auxiliary pumps serves as an actuator pump for supplying fluid from the fluid sump in the transaxle housing of the first hydraulic transaxle to a hydraulic actuator disposed outside of the transaxle housings of the first and second hydraulic transaxles via the other of the delivery ducts. The second suction duct is fluidly connected to the transaxle housing of the second hydraulic transaxle so as to supply fluid from the transaxle housing of the second hydraulic transaxle to the hydraulic circuit in the transaxle housing of the first hydraulic transaxle. Therefore, the pump housing is available to support both the charge pump for supplying fluid to the second hydraulic transaxle and the actuator pump for supplying fluid to the hydraulic actuator, and functions as a common suction port for the two auxiliary pumps and as delivery ports for the respective auxiliary pumps, thereby reducing the number of parts.

Preferably, the hydraulic transaxle further comprises a center section having the hydraulic pump and the hydraulic motor mounted thereon so as to define the hydraulic circuit between the hydraulic pump and the hydraulic motor. The center section is disposed in the transaxle housing of the first hydraulic transaxle and is connected to the pump housing so as to fluidly connect the hydraulic circuit to the second suction duct. Therefore, the center section defining the hydraulic circuit between the hydraulic pump and the hydraulic motor is also used to support the pump housing, thereby reducing costs.

Preferably, an input shaft of the hydraulic pump is extended into the pump housing so as to drive the auxiliary pumps. Therefore, only the extension of the input shaft of the hydraulic pump is needed for driving the auxiliary pumps, thereby reducing the number of parts and costs.

Preferably, the auxiliary pumps are disposed opposite each other in an axial direction of the input shaft of the hydraulic pump, and the suction duct has an opening that opens outward to the fluid sump at a position on the pump housing between the auxiliary pumps in the axial direction of the input shaft of the hydraulic pump, and bifurcates in the pump housing to the auxiliary pumps. Therefore, the suction duct has a simple form to be shared between the auxiliary pumps so as to simplify a duct structure in the pump housing for supplying fluid to the auxiliary pumps, thereby reducing costs.

Preferably, the suction duct has an opening at a side of the pump housing, and the delivery ducts have respective openings at another side of the pump housing opposite to the suction duct with respect to the input shaft of the hydraulic pump. Therefore, a filter can be disposed in the fluid sump to be connected to the suction duct on one side of the pump housing, and port members for supplying fluid to the outside of the transaxle housing can be disposed in the transaxle housing on the other side of the pump housing so as to extend from the delivery ports, so that the filter and the port members are prevented from interfering with each other.

Preferably, the pump housing serves as a first pump housing, and the hydraulic transaxle further comprises a second pump housing and a biasing member. The second pump housing is disposed in the transaxle housing so as to have one of the auxiliary pumps mounted thereon. The second pump housing is movable away from the auxiliary pump mounted on the second pump housing according to an increase of a pressure of fluid delivered from the auxiliary pump mounted on the second pump housing. The biasing member is disposed in the transaxle housing so as to bias the second pump housing toward the auxiliary pump mounted on the second pump housing against the pressure of fluid delivered from the auxiliary pump mounted on the second pump housing. Therefore, the second pump housing with the biasing member functions as a relief valve for regulating the pressure of fluid delivered from the auxiliary pump, so as to need no additional relief valve serving as the pressure regulation valve, thereby reducing the number of parts and costs.

These, further and other objects, features and advantages of the invention will appear more fully from the following description with reference to drawings.

DETAILED DESCRIPTION OF THE INVENTION

Figure 1:
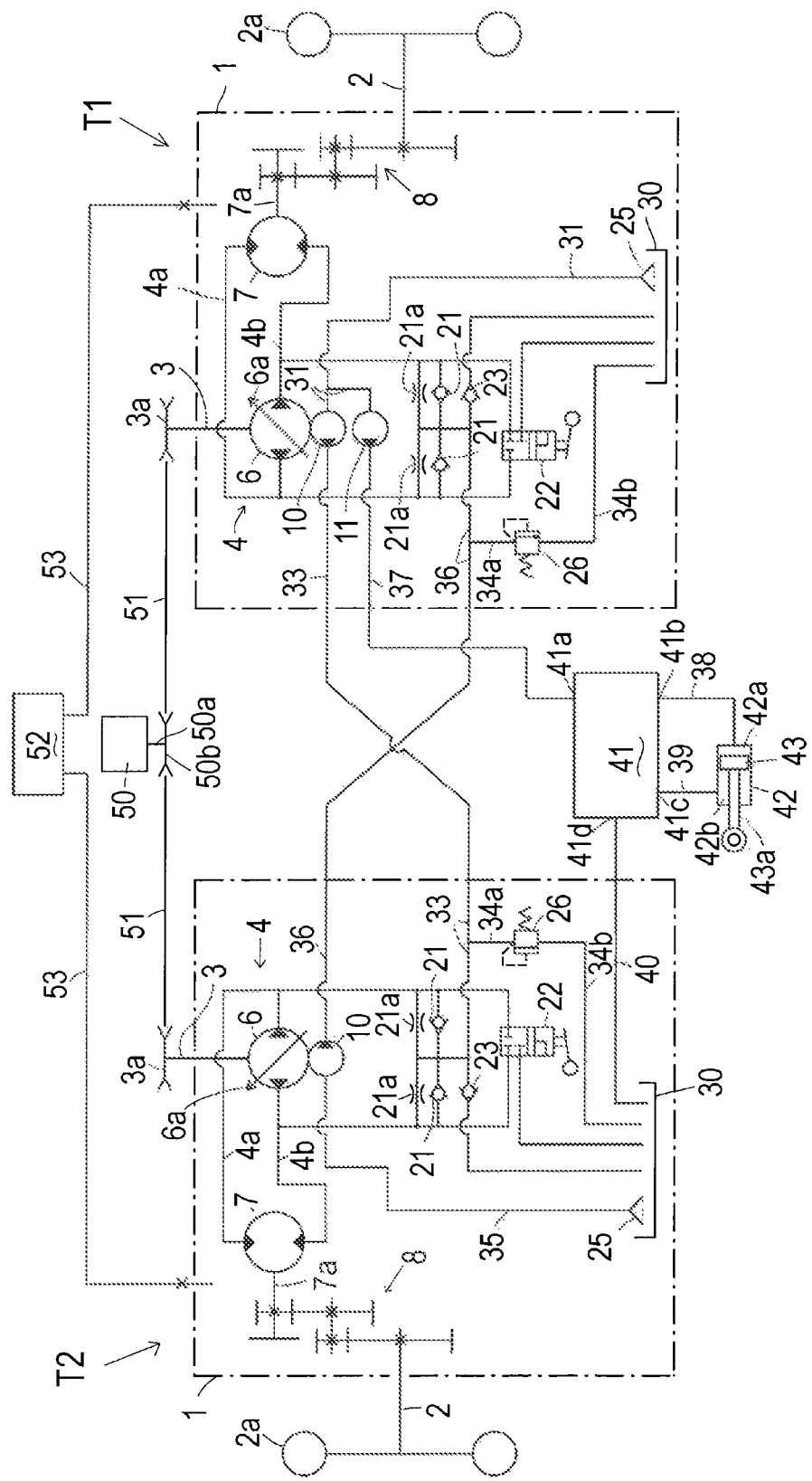
FIG. 1 is a hydraulic circuit diagram of a zero-turn vehicle traveling power transmission system 100 including first and second hydraulic transaxles T1 and T2 serving as right and left transaxles for driving respective right and left axles 2.

A hydraulic zero-turn vehicle driving system 100 for driving right and left drive wheels 2a of a vehicle will be described with reference to FIG. 1. This system 100 includes a first hydraulic transaxle T1 and a second hydraulic transaxle T2, serving as right and left transaxles carrying respective right and left drive wheels 2a. First hydraulic transaxle T1 is defined as including later-discussed two auxiliary pumps 10 and 11, and second hydraulic transaxle 12 is defined as including only one auxiliary pump 10. This is only the difference between transaxles T1 and T2.

In FIG. 1, the elements in transaxle T1 designated by respective reference numerals are integral to those in transaxle T2 designated by the same reference numerals. In the illustrated embodiment, transaxle T1 serves as the right transaxle and transaxle T2 serves as the left transaxle, however, each of transaxles T1 and 12 can serve as either the right transaxle or the left transaxle. Alternatively, two transaxles T1 each of which includes two auxiliary pumps 10 and 11 may serve as the right and left transaxles.

Each of first and second transaxles T1 and T2 includes a transaxle housing 1 defining a fluid sump 30 therein. An axle 2 is supported by transaxle housing 1 and projects outward so as to have one of right and left drive wheels 2a on a distal end thereof.

A hydraulic motor 7, having a motor shaft 7a serving as an output shaft of hydraulic motor 7, is disposed in transaxle housing 1, and motor shaft 7a is drivingly connected to axle 2 via a reduction gear train 8 so as to drive axle 2. A hydraulic pump 6 is disposed in transaxle housing 1 so as to supply fluid to hydraulic motor 7. Hydraulic pump 6 is provided with a movable swash plate 6a for controlling a fluid delivery of hydraulic motor 7 in quantity and direction.

A hydraulic circuit 4 is configured in transaxle housing 1 so as to fluidly connect hydraulic pump 6 to hydraulic motor 7, thereby constituting a hydrostatic stepless transmission (HST). Hydraulic circuit 4 includes a pair of fluid passages 4a and 4b interposed between hydraulic pump 6 and hydraulic motor 7. Movable swash plate 6a of hydraulic pump 6 is operated to select whether hydraulic pump 6 delivers fluid to hydraulic motor 7 via fluid passage 4a or fluid passage 4b, and this selection of fluid delivery direction of hydraulic pump 6 means selection of whether axle 2 is rotated forward or backward.

Hydraulic pump 6 has a pump shaft 3 serving as an input shaft of hydraulic pump 6. Pump shaft 3 projects outward from transaxle housing 1 so as to be provided thereon with an input pulley 3a. An engine 50 has an engine output shaft 50a on which an engine output pulley 50b is fixed. A belt 51 is looped over engine output pulley 50b and input pulleys 3a of respective transaxles T1 and T2, thereby transmitting power from engine output shaft 50a to pump shafts 3 of respective transaxles T1 and T2.

In transaxle housing 1 of each of transaxles T1 and T2, a pair of charge check valves 21 are fluidly connected to respective fluid passages 4a and 4b of hydraulic circuit 4. Each of charge check valves 21 is opened to allow flow of fluid into corresponding fluid passage 4a or 4b so as to supplement fluid to hydraulic circuit 4 when corresponding fluid passage 4a or 4b is hydraulically depressed. Charge check valves 21 are provided with respective orifices 21a. Each of orifices 21a bypasses corresponding charge check valve 21 and is constantly opened to corresponding fluid passage 4a or 4b so as to expand a neutral zone of the HST, thereby surely stopping axle 2 when movable swash plate 6a is set at its neutral position.

Further, a drain valve 22 and a supplementary charge check valve 23 are disposed in each transaxle housing 1. Drain valve 22 is normally closed. When the vehicle having system 100 is towed, each of drain valves 22 of transaxles T1 and T2 are switched to be opened to fluidly connect fluid passages 4a and 4b to fluid sump 30 so as to drain fluid from hydraulic circuit 4 to fluid sump 30, thereby allowing drive wheels 2a to rotate freely from hydraulic pressure of the HST. Supplementary charge check valves 23 are opened to supply fluid to respective hydraulic circuits 4 when engine 50 and auxiliary pumps 10 serving as later-discussed charge pumps are stationary.

A reservoir 52 is disposed outside of transaxle housings 1 of respective transaxles T1 and T2, and a reservoir fluid passage 53 is interposed between reservoir 52 and each transaxle housing 1. When each of pump shafts 3 is driven by engine 50 to actuate the HST including hydraulic pump 6 and motor 7, fluid of fluid sump 30 in each transaxle housing 1 is heated so as to increase in volume. Reservoir 52 absorbs this volumetric increase of fluid in fluid sump 30 of each transaxle housing 1 via reservoir fluid passage 53.

In transaxle housing 1 of transaxle T1, a fluid suction passage 31 is fluidly connected to fluid sump 30 via a filter 25, and bifurcates to auxiliary pumps 10 and 11 so as to supply fluid from fluid sump 30 to suction ports of auxiliary pumps 10 and 11. Auxiliary pump 10 of transaxle T1 serves as a charge pump for supplying fluid from fluid sump 30 in transaxle housing 1 of transaxle T1 to hydraulic circuit 4 in transaxle housing 1 of transaxle T2. In this regard, a fluid delivery passage 33 is extended in transaxle housing 1 of transaxle T1 from a delivery port of auxiliary pump 10 of transaxle T1.

Fluid delivery passage 33 is extended outward from transaxle housing 1 of transaxle T1, and is extended into transaxle housing 1 of transaxle T2. In transaxle housing 1 of transaxle T2, fluid delivery passage 33 is fluidly connected to charge check valves 21. In transaxle housing 1 of transaxle T2, a pressure regulation valve 26 of transaxle T2 is fluidly connected to fluid delivery passage 33 at an upstream side of charge check valves 21 of transaxle T2 via a valve passage 34a of transaxle T2 so as to regulate a pressure of fluid in fluid delivery passage 33, and so as to drain excessive fluid to fluid sump 30 of transaxle T2 via a drain passage 34b of transaxle T2.

Auxiliary pump 10 of transaxle T2 serves as a charge pump for supplying fluid from fluid sump 30 in transaxle housing 1 of transaxle T2 to hydraulic circuit 4 in transaxle housing 1 of transaxle T1. In this regard, in transaxle housing 1 of transaxle T2, a fluid suction passage 35 is extended from a filter 25 in fluid sump 30 of transaxle T2 to a suction port of auxiliary pump 10 of transaxle T2. In transaxle housing 1 of transaxle T2, a fluid delivery passage 36 is extended from a delivery port of auxiliary pump 10 of transaxle T2.

Fluid delivery passage 36 is extended outward from transaxle housing 1 of transaxle T2, and is extended into transaxle housing 1 of transaxle T1. In transaxle housing 1 of transaxle T1, fluid delivery passage 36 is fluidly connected to charge check valves 21. In transaxle housing 1 of transaxle T1, a pressure regulation valve 26 of transaxle T1 is fluidly connected to fluid delivery passage 36 at an upstream side of charge check valves 21 of transaxle T1 via a valve passage 34a of transaxle T1 so as to regulate a pressure of fluid in fluid delivery passage 36 and so as to drain excessive fluid to fluid sump 30 of transaxle T1 via a drain passage 34b of transaxle T1.

Pipes are interposed between transaxle housings 1 of transaxles T1 and T2 so as to serve as external portions of fluid delivery passages 33 and 36 outside of transaxle housings 1. The reason why each of auxiliary pumps 10 serving as charge pumps supplies fluid from fluid sump 30 in one transaxle housing 1 to hydraulic circuit 4 in the other transaxle housing 1 is to effectively radiate heat from fluid when flowing in the external portions of fluid delivery passages 33 and 36.

Auxiliary pump 11 of transaxle T1 serves as an actuator pump for supplying fluid from fluid sump 30 in transaxle housing 1 of transaxle T1 to a hydraulic actuator 42 disposed outside of transaxle housings 1 of transaxles T1 and T2. For example, if the vehicle equipped with system 100 is a lawn mower, hydraulic actuator 42 may be an actuator for lifting a mower deck. In this regard, a fluid delivery passage 37 is extended in transaxle housing 1 of transaxle T1 from a delivery port of auxiliary (actuator) pump 11 of transaxle T1. Fluid delivery passage 37 is extended outward from transaxle housing 1 of transaxle T1, and is connected to a pump port 41a of a hydraulic valve unit 41 disposed outside of transaxle housings 1.

Hydraulic actuator 42 is a double-acting hydraulic cylinder having a piston 43, which divides an inner space thereof into two fluid chambers 42a and 42b. Hydraulic valve unit 41 has ports 41b and 41c fluidly connected to respective fluid chambers 42a and 42b via respective fluid passages 38 and 39. A piston rod 43a is extended from piston 43 so that piston rod 43a is telescopically moved by fluid supply and discharge to and from fluid chambers 42a and 42b. Piston rod 43a is contracted by moving piston 43 toward fluid chamber 42a, and is extended by moving piston 43 toward fluid chamber 42b. Further, hydraulic valve unit 41 has a drain port (tank port) 41d, and a fluid drain passage 40 is extended from drain port 41d to fluid sump 30 in transaxle housing 1 of transaxle T2.

In this way, in hydraulic zero-turn vehicle driving system 100, transaxle housing 1 of first hydraulic transaxle T1 incorporates auxiliary pump 11 serving as a hydraulic fluid source for driving hydraulic actuator 42, e.g., an actuator for lifting a mower deck, so that the vehicle, e.g., a lawn mower, needs no additional hydraulic source to be disposed outside of transaxle housings 1 of transaxles T1 and T2 to supply fluid to hydraulic actuator 42, thereby ensuring an appropriate ground clearance of the vehicle.

A first embodiment of first hydraulic transaxle T1 as a structural adaptation of transaxle T1 in system 100 shown in FIG. 1 will be described with reference to FIGS. 2 to 7. However, if structural features of elements designated by reference numerals that are the same as those drawn in FIG. 1 have been fully described by the aforesaid description of system 100 referring to FIG. 1, description of the structural features will be omitted.

Figure 2:
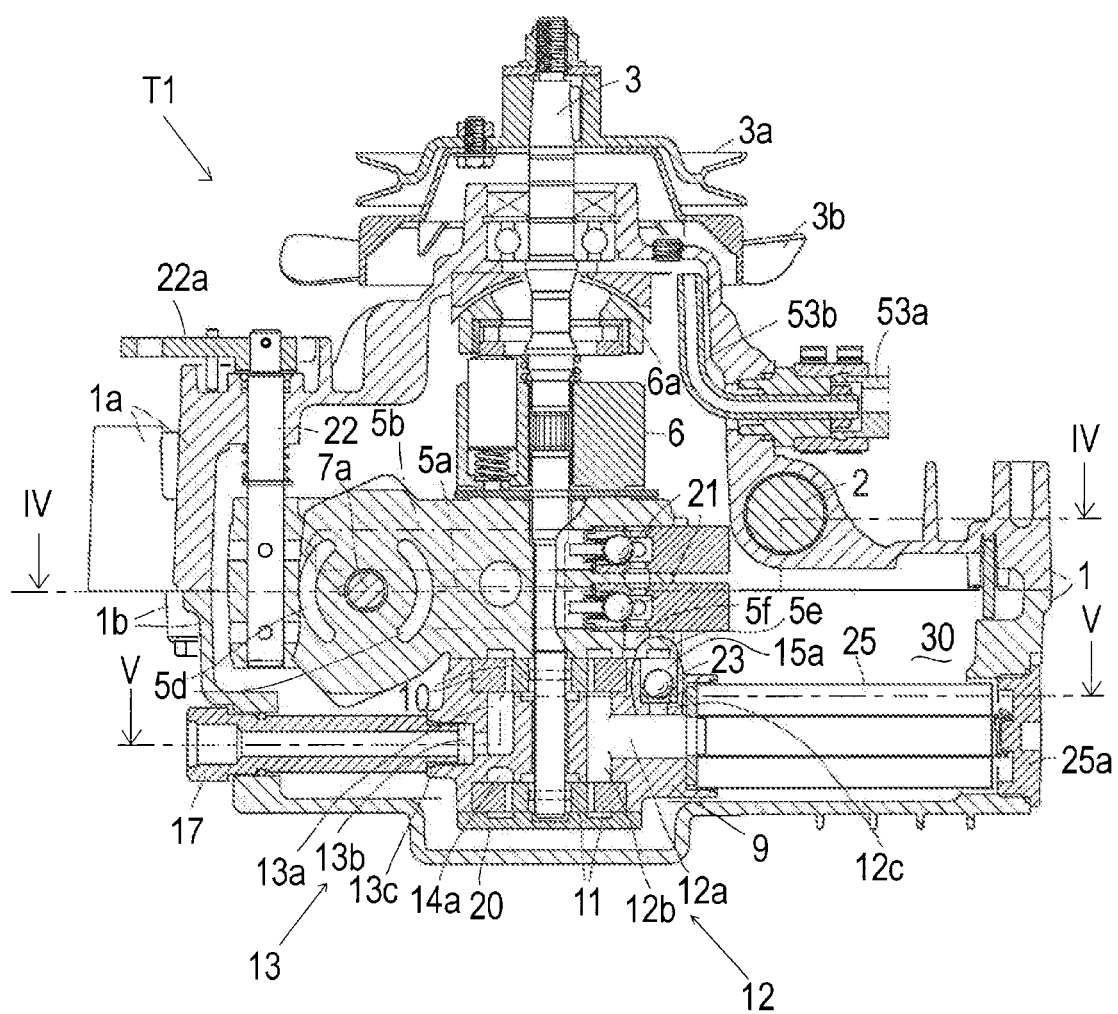
FIG. 2 is a sections side view of a hydraulic transaxle serving as first hydraulic transaxle T1 according to a first embodiment used in system 100 shown in FIG. 1.
Figure 3:
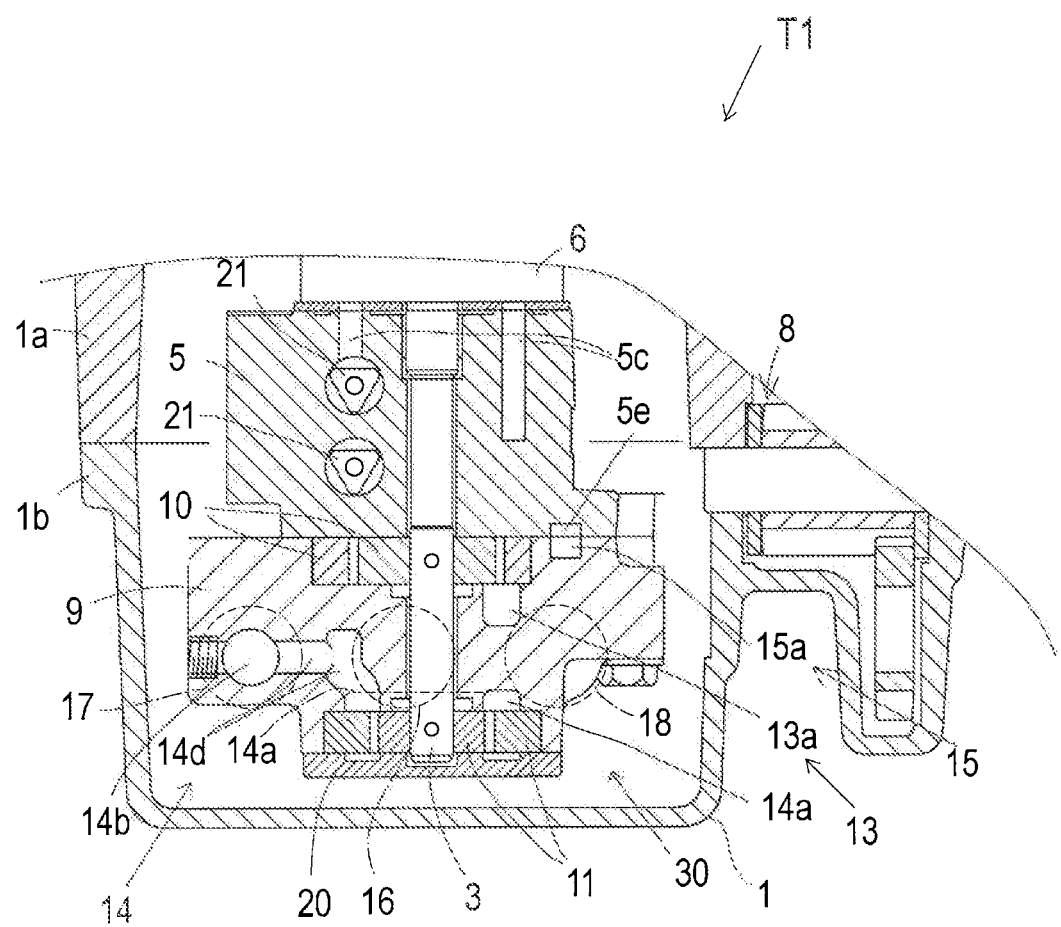
FIG. 3 is a fragmentary sectional front view of the hydraulic transaxle shown in FIG. 2.
Figure 4:
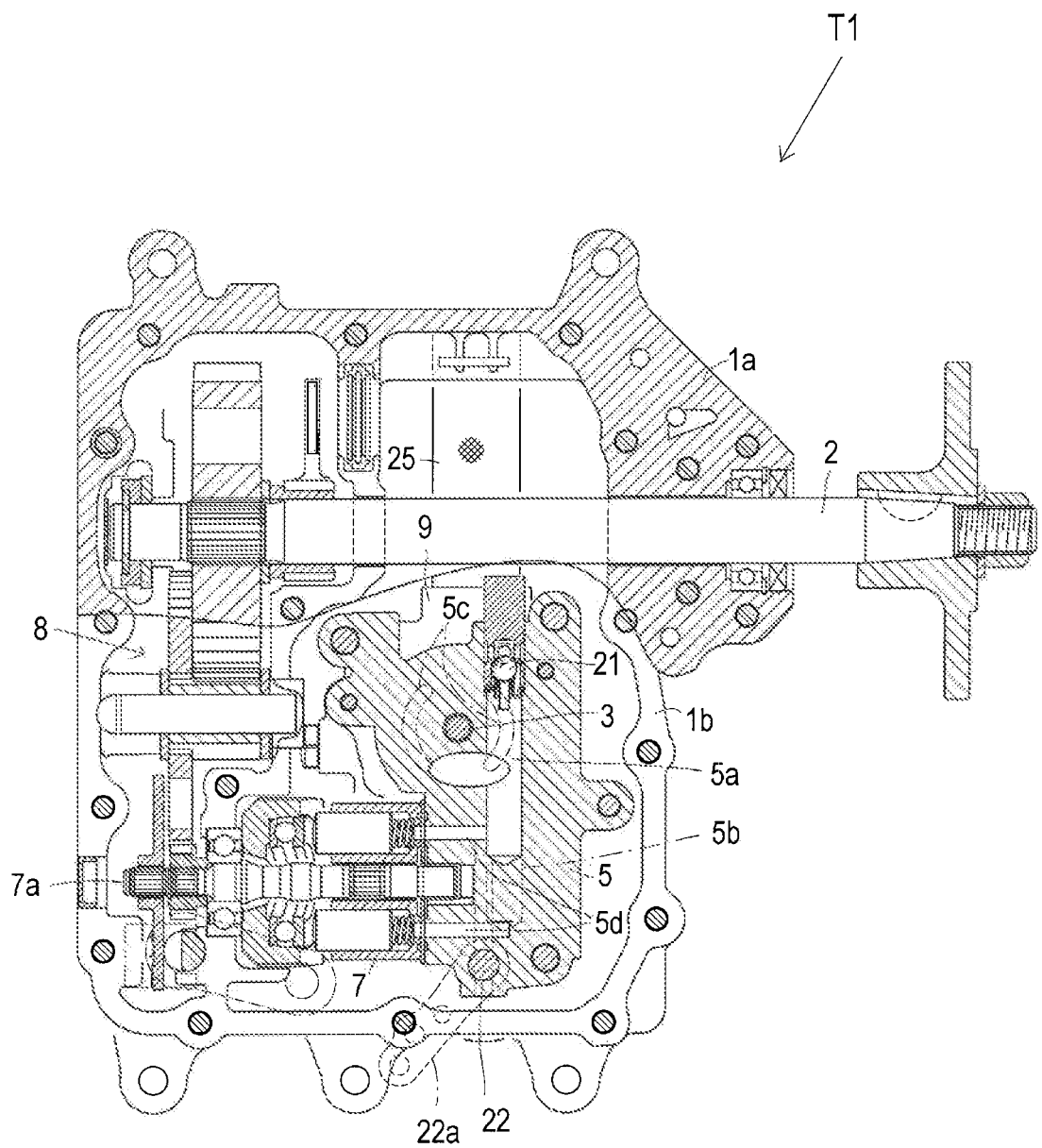
FIG. 4 is a developed sectional plan view of the hydraulic transaxle taken along IV-IV line of FIG. 2.

As shown in FIGS. 2 to 4, horizontal axle 2 and vertical pump shaft 3 are journalled in transaxle housing 1, and a center section 5 is disposed in transaxle housing 1. More specifically, transaxle housing 1 is constituted by joining an upper housing part 1a and a lower housing part 1b to each other at a horizontal joint plane. Transaxle housing 1 is filled therein with fluid defining fluid sump 30 as shown in FIG. 1. A pipe 53a is joined to transaxle housing 1 (upper housing part 1a) so as to serve as reservoir fluid passage 53 extended from reservoir 52 for absorbing or supplying fluid from and to fluid sump 30 as shown in FIG. 1. A siphon 53b is extended from pipe 53a and is fitted into transaxle housing 1.

As shown in FIG. 2, hydraulic pump 6 is mounted on a horizontal pump mounting surface formed on a top surface of center section 5, and vertical pump shaft 3 of hydraulic pump 6 is disposed at the center of the pump mounting surface. Pump shaft 3 is extended upward through movable swash plate 6a, and projects upward from transaxle housing 1 so as to be fixedly provided thereon with input pulley 3a and a cooling fan 3b. Pump shaft 3 is extended downward from hydraulic pump 6 through center section 5, and projects downward from center section 5 into a later-discussed pump housing 9 fixed to a bottom surface of center section 5.

Hydraulic motor 7 is mounted on a vertical motor mounting surface (not shown) formed on center section 5. As shown in FIGS. 2 and 4, horizontal motor shaft 7a of hydraulic motor 7 is disposed at the center of the motor mounting surface, is extended through center section 5 in parallel to axle 2, and projects outward from center section 5 so as to be drivingly connected to axle 2 via reduction gear train 8.

A pair of pump kidney ports 5c shown in FIG. 4 are opened at the pump mounting surface to hydraulic pump 6, and a pair of motor kidney ports 5d shown in FIG. 2 are opened at the motor mounting surface to hydraulic motor 7. Center section 5 is formed therein with ducts 5a and 5b serving as fluid passages 4a and 4b shown in FIG. 1. Duct 5a fluidly connects one of pump kidney ports 5c to one of motor kidney ports 5d, and duct 5b fluidly connects the other of pump kidney ports 5c to the other of motor kidney ports 5d, thereby forming hydraulic circuit 4 fluidly connecting hydraulic pump 6 to hydraulic motor 7.

As shown in FIG. 2, upper and lower charge check valves 21 with respective orifices 21a are disposed in center section 5 so as to be fluidly connected to respective ducts 5a and 5b. Drain valve 22 is a vertical rotary shaft valve, which is extended through center section 5 and projects upward from transaxle housing 1 so as to be fixedly provided on a top thereof with an operation lever 22a, as shown in FIG. 2.

As shown in FIGS. 2 and 3, pump housing 9 is fixed at a top surface thereof to the bottom surface of center section 5. Pump housing 9 is formed with an upwardly opened upper recess and a downwardly opened lower recess. Upper and lower trochoidal pumps serving as auxiliary pumps 10 and 11 are fitted in the upper and lower recesses of pump housing 9. In this embodiment, the upper trochoidal auxiliary pump is referred to as upper pump 10, and the lower trochoidal auxiliary pump is referred to as lower pump 11, because it is assumed that the upper pump serves as charge pump 10 for supplying fluid to hydraulic circuit 4 of transaxle T2, and the lower pump serves as actuator pump 11 for supplying fluid to hydraulic actuator 42. However, alternatively, the upper trochoidal auxiliary pump may serve as actuator pump 11, and the lower trochoidal auxiliary pump may serve as charge pump 10.

The lower portion of vertical pump shaft 3 extended downward from center section 5 is extended through upper pump 10, pump housing 9, and lower pump 11, so as to serve as the drive shaft for upper and lower pumps 10 and 11. More specifically, inner rotors of the trochoidal pumps serving as upper and lower pumps 10 and 11 are fixed on pump shaft 3. In other words, upper and lower pumps 10 and 11 are opposite each other in the axial direction of pump shaft 3. Upper pump 10 defines a top surface of pump housing 9, and faces upward to the bottom surface of center section 5. Lower pump 11 is disposed so as to define a bottom surface of pump housing 9. A bottom cover 20 is fixed to a bottom end of pump housing 9 so as to cover a bottom surface of lower pump 11 and so as to support a bottom end of pump shaft 3 projecting slightly downward from lower pump 11.

Horizontal cylindrical filter 25 is submerged in fluid sump 30 in transaxle housing 1, and is fixed at an inside axial end thereof to a side portion of pump housing 9. In this embodiment, horizontal cylindrical filter 25 is extended in the fore-and-aft direction of transaxle T1 perpendicular to axle 2 on an assumption that axle 2 is extended in the lateral direction of transaxle T1. Transaxle housing 1 is formed with an outwardly opened opening through which filter 25 can be inserted into transaxle housing 1. Filter 25 fixed at the inside axial end thereof to pump housing 9 is disposed at an outside axial end thereof in this opening of transaxle housing 1, and a cap 25a is fitted into the opening so as to cover the outside axial end of filter 25.

Further, a ball check valve, serving as supplementary charge check valve 23, and a relief valve, serving as pressure regulation valve 26, are fitted in pump housing 9 so as to be fluidly connected to a later-discussed charge duct 15.

Referring to FIGS. 2, 3 and 5 to 8, pump housing 9 is therein formed with a suction duct 12, an upper pump delivery duct 13, a lower pump delivery duct 14 and a charge duct 15. Suction duct 12 includes a horizontal straight duct part 12a and a vertical arcuate duct part 12b. Horizontal straight duct part 12a is disposed at a vertical middle portion of pump housing 9 between upper and lower pumps 10 and 11, and is extended horizontally straight in the fore-and-aft direction of transaxle T1 coaxially to filter 25. Horizontal straight duct part 12a has an outer end that is opened outward from pump housing 9 to an inner space of cylindrical filter 25 fixed to pump housing 9. Horizontal straight duct part 12a has an inner end connected to a vertical middle portion of vertical arcuate duct part 12b.

Figure 5:
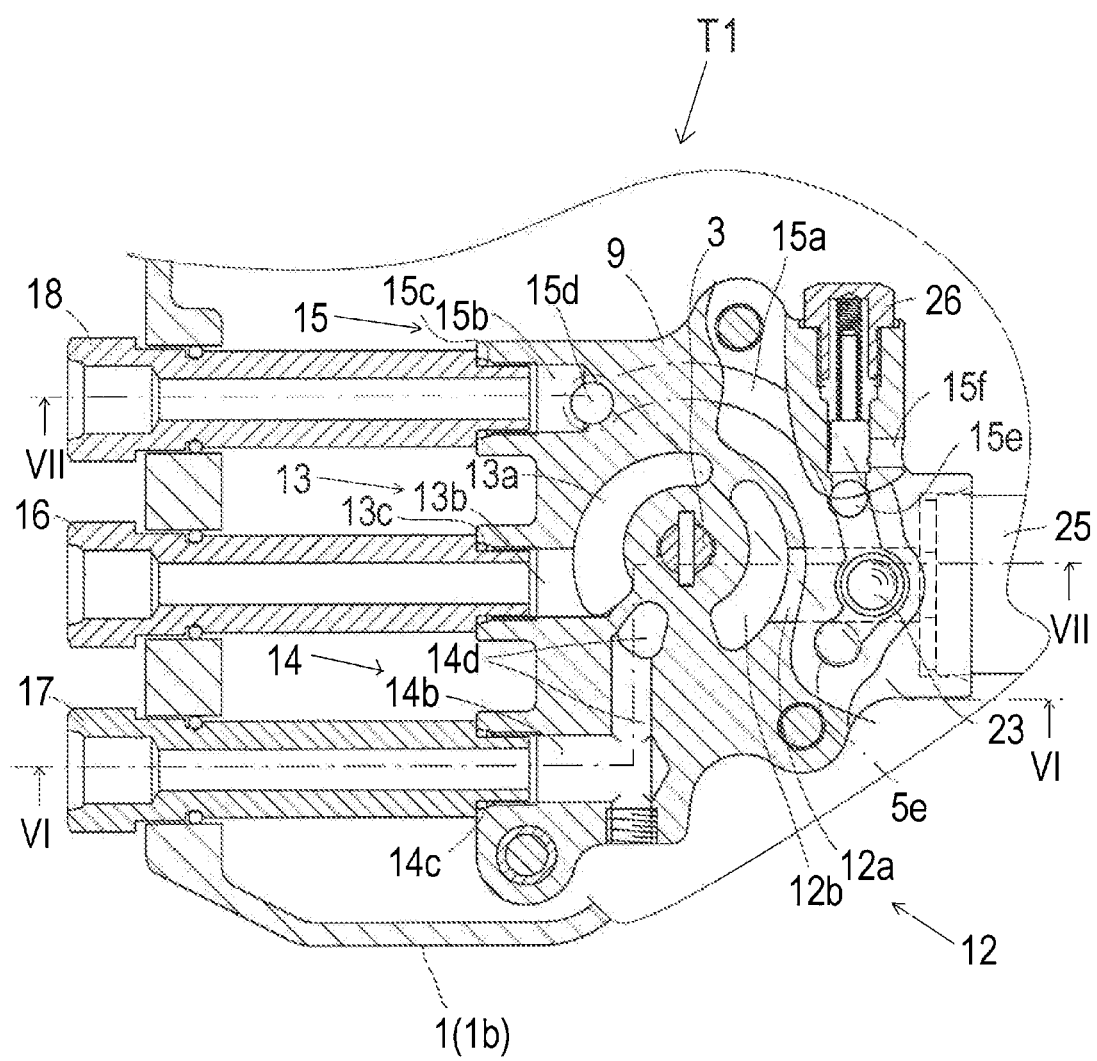
FIG. 5 is a fragmentary developed sectional plan view of the hydraulic transaxle taken along V-V line of FIG. 2.
Figure 6:
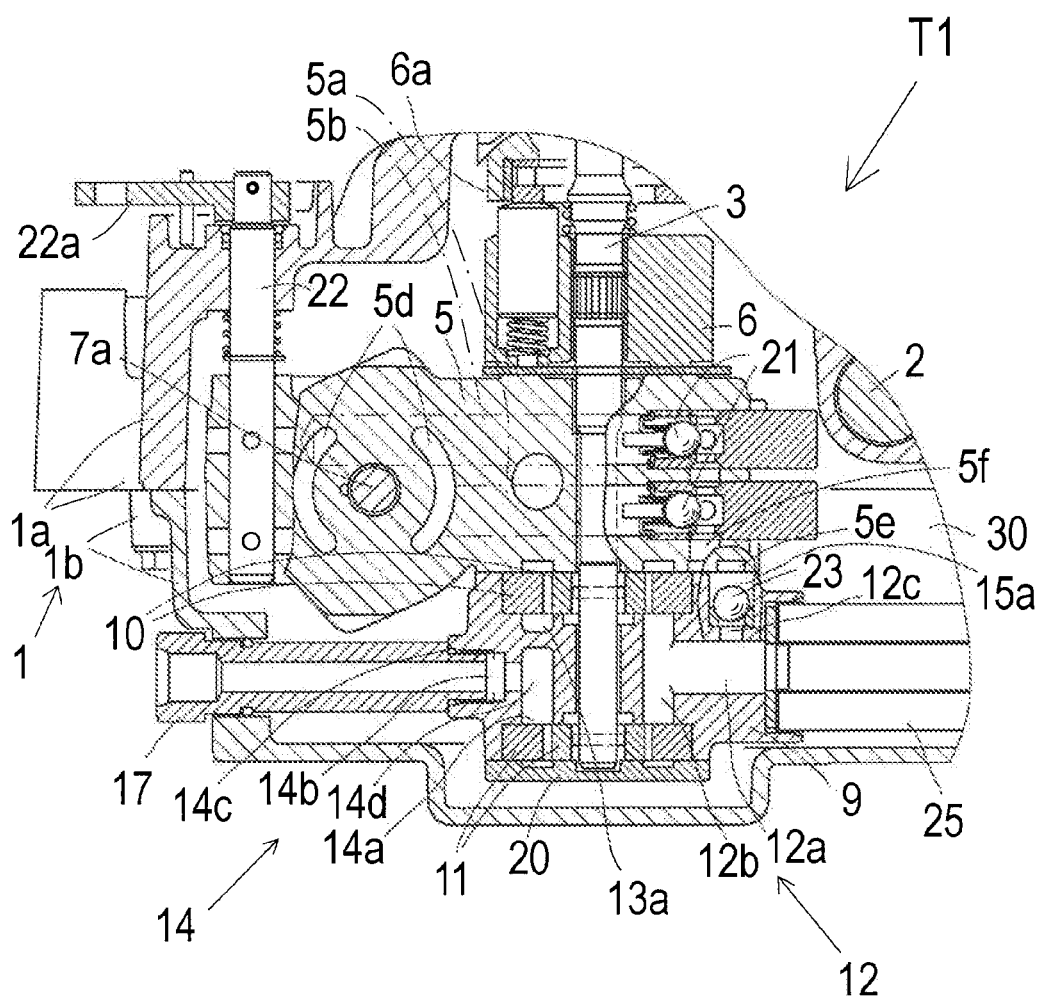
FIG. 6 is a fragmentary developed sectional side view of the hydraulic transaxle taken along VI-VI line of FIG. 5.
Figure 7:
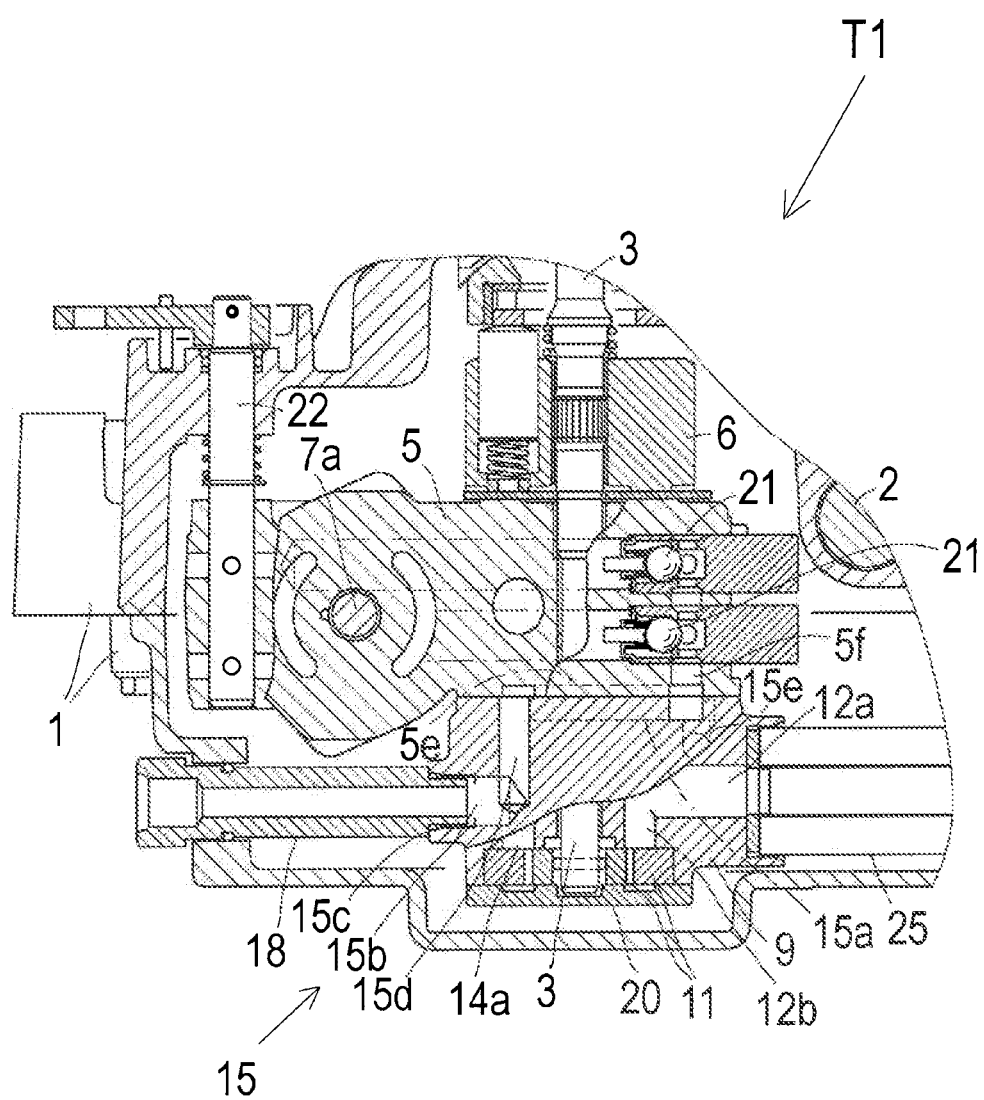
FIG. 7 is a fragmentary developed sectional side view of the hydraulic transaxle taken along VII-VII line of FIG. 5.

Vertical arcuate duct part 12b is arcuate when viewed in plan as shown in FIG. 5, and is extended vertically so as to be opened at a top thereof to upper pump 10, and at a bottom thereof to lower pump 11. In other words, vertical arcuate duct part 12b serves as a kidney-type pump suction port shared between upper and lower pumps 10 and 11. Therefore, suction duct 12 entirely serves as fluid suction passage 31, which is fluidly connected to fluid sump 30 via filter 25 and bifurcates to upper and lower auxiliary pumps 10 and 11 so as to supply fluid from fluid sump 30 to upper and lower auxiliary pumps 10 and 11.

Ducts 13, 14 and 15 include respective horizontal straight duct parts 13b, 14b and 15b. These horizontal straight duct parts 13b, 14b and 15b are formed in parallel in a side portion of pump housing 9 opposite in the fore-and-aft direction of transaxle T1 to the side portion of pump housing 9 having horizontal straight duct part 12a of suction duct 12 therein with respect to pump shaft 3. Parallel horizontal straight duct parts 13b, 14b and 15b are extended horizontally in the fore-and-aft direction of transaxle T1, and are aligned horizontally in the lateral direction of transaxle T1, so that horizontal straight duct part 13b is disposed between horizontal straight duct parts 14b and 15b. More specifically, horizontal straight duct part 13b is extended approximately coaxially to horizontal straight duct part 12a of suction duct 12, and horizontal straight duct parts 14b and 15b are offset rightward and leftward from horizontal straight duct part 13b.

Horizontal straight duct parts 13b, 14b and 15b have respective openings 13c, 14c and 15c disposed on a common vertical plane defined by an outer side surface of the side portion of pump housing 9 having horizontal straight duct parts 13b, 14b and 15b therein.

Parallel port tubes 16, 17 and 18 are extended horizontally in the fore-and-aft direction of transaxle T1, and are aligned in the horizontal lateral direction of transaxle T1 so that port tube 16 is disposed between right and left port tubes 17 and 18. Port tubes 16, 17 and 18 are inserted into transaxle housing 1 via respective holes formed in an outer wall of transaxle housing 1, and are fitted (e.g., screwed) at respective inner end portions thereof into respective horizontal straight duct parts 13b, 14b and 15b of respective ducts 13, 14 and 15 via respective openings 13c, 14c and 15c.

Port tubes 16, 17 and 18 have respective open outer ends disposed outward from transaxle housing 1. These outer ends of port tubes 16, 17 and 18 are aligned in the horizontal lateral direction of transaxle T1, and are disposed on a common vertical plane. As mentioned in the description of system 100 shown in FIG. 1, pipes are interposed between transaxle housings 1 of transaxles T1 and T2 so as to serve as external portions of fluid passages 33, 36 and 37. These pipes are connected at respective ends thereof to the outer ends of port tubes 16, 17 and 18.

Upper pump delivery duct 13 includes a vertical arcuate duct part 13a. Vertical arcuate duct part 13a is arcuate when viewed in plan as shown in FIG. 5, is extended vertically downward in pump housing 9, and is opened upward to upper pump 10 so as to serve as a kidney-type pump delivery port for upper pump 10. Vertical arcuate portion 13a is sloped at a bottom portion or is partly extended downward so as to have a deepest portion, from which horizontal straight duct part 13b is extended horizontally straight in the fore-and-aft direction of transaxle T1 and has opening 13c at the outer end thereof opened outward from pump housing 9. Therefore, upper pump duct 13 and port tube 16 in transaxle housing 1 of transaxle T1 serve as the portion of fluid delivery passage 33 in transaxle housing 1 of transaxle T1.

Lower pump delivery duct 14 includes an arcuate duct part 14a, and includes a connection duct part 14d connecting arcuate duct part 14a to horizontal straight duct part 14b. Arcuate duct part 14a is arcuate when viewed in plan (not shown, however, similar to arcuate duct part 13a), and is opened downward to lower pump 11 so as to serve as a kidney-type pump delivery port for lower pump 11. Connection duct part 14d is extended upward from arcuate duct part 14a and is bent at an upper portion thereof to extend horizontally in the lateral direction of transaxle T1. Horizontal straight duct part 14b is extended from connection duct part 14d horizontally in the fore-and-aft direction of transaxle T1 so as to form an L-shaped duct when viewed in plan with the horizontally extended portion of connection duct part 14d, and has opening 14c at the outer end thereof opened outward from pump housing 9. Therefore, lower pump delivery duct 14 and port tube 17 in transaxle housing 1 of transaxle T1 serve as the portion of fluid delivery passage 37 in transaxle housing 1 of transaxle T1.

Charge duct 15 has an arcuate duct part 15a, and includes a vertical duct part 15d connecting an inner end portion of horizontal straight duct part 15b to an end portion of arcuate duct part 15a. Arcuate duct part 15a coincides to an arcuate duct 5e formed on a bottom surface of center section 5. Center section 5 is formed therein with a vertical duct 5f, which is extended vertically upward from arcuate duct 5e so as to be fluidly connected to charge check valves 21. Therefore, port tube 18, duct parts 15a, 15b, and 15d of charge duct 15 in pump housing 9, and ducts 5e and 5f in center section 5 serve as the portion of fluid delivery passage 36 in transaxle housing 1 of transaxle T1.

A vertical duct 15e and a horizontal duct 15f are formed in pump housing 9 of transaxle T1. Vertical duct 15e is extended downward from arcuate duct part 15a of charge duct 15 to pressure regulation valve 26 fitted in pump housing 9 so as to serve as valve passage 34a shown in FIG. 1. Horizontal duct 15f is extended from pressure regulation valve 26 fitted in pump housing 9, and is opened outward from pump housing 9 to fluid sump 30 in transaxle housing 1 of transaxle T1 so as to serve as drain passage 34b shown in FIG. 1.

A supplementary charge duct 12c is foamed in pump housing 9 of transaxle T1 so as to extend vertically upward from horizontal straight duct part 12a of suction duct 12 to arcuate duct part 15a of charge duct 15. Supplementary charge check valve 23 is interposed between arcuate duct part 15a of charge duct 15 and supplementary charge duct 12c. When engine 50 is stationary and fluid leakage of hydraulic circuit 4 (fluid ducts 5a and 5b in center section 5) occurs because the vehicle is parked on a slope, for example, supplementary charge check valve 23 is opened to shortcut fluid supply from horizontal straight duct part 12a of suction duct 12 to arcuate duct part 15a of charge duct 15 so as to supplement fluid to hydraulic circuit 4, thereby preventing the vehicle from unexpectedly descending the slope.

Transaxle housing 1 of transaxle T2 incorporates an HST including a center section that is identical or similar to center section 5 of transaxle T1, and incorporates a pump housing supporting only charge pump 10 for supplying fluid to hydraulic circuit 4 of transaxle T1. This pump housing is formed with a duct for supplying fluid from fluid sump 30 of transaxle T2 via filter 25 of transaxle T2 to charge pump 10 of transaxle T2, thereby constituting fluid suction passage 35.

Further, this pump housing in transaxle housing 1 of transaxle T2 is formed with a duct for supplying fluid from charge pump 10 of transaxle T2. This duct is fluidly connected to port tube 18 in transaxle housing 1 of transaxle T1, thereby completing fluid delivery passage 36 for supplying fluid to the HST of transaxle T1.

Further, the center section and the pump housing in transaxle housing 1 of transaxle T2 are formed with a duct for supplying the HST of transaxle T2 with fluid from charge pump 10 of transaxle T1. This duct is fluidly connected to port tube 16 via the external pipe, thereby completing fluid delivery passage 33 for supplying fluid from charge pump 10 of transaxle T1 to the HST of transaxle T2.

A second embodiment of first hydraulic transaxle T1 as a structural adaptation of transaxle T1 in system 100 shown in FIG. 1 will be described with reference to FIGS. 8 to 10. However, if structural features of elements designated by reference numerals that are the same as those drawn in FIGS. 1 to 7 have been fully described by the aforesaid description of system 100 referring to FIG. 1 and the aforesaid description of transaxle T1 referring to FIGS. 2 to 7, description of the structural features in the second embodiment will be omitted.

In comparison with pump housing 9 in the first embodiment, a pump housing 44 in the second embodiment is flat at top and bottom surfaces so as to have none of the upper and lower recesses for accommodating upper and lower pumps 10 and 11. Pump housing 44 is formed therein with delivery ducts 13 and 14 and charge duct 15, similar to ducts 13, 14 and 15 formed in pump housing 9 in the first embodiment.

In comparison with center section 5 in the first embodiment, center section 5 in the second embodiment is expanded downward to form a downwardly opened recess in which the trochoidal pump serving as upper pump 10 is fitted. Arcuate duct 5e formed in center section 5 of the second embodiment is disposed to surround upper pump 10 so as to coincide arcuate duct part 15a of charge duct 15 formed in pump housing 44. A suction duct 45 formed in pump housing 44 does not branch downward to supply fluid to lower pump 11. Therefore, suction duct 45 is L-shaped when viewed in side so as to supply only upper pump 10 with fluid from fluid sump 30 through filter 25 fixed to pump housing 44.

The trochoidal pump serving as lower pump 11 is disposed immediately below the bottom surface of pump housing 44. The inner rotors of the trochoidal pumps serving as upper and lower pumps 10 and 11 are fixed on pump shaft 3. A cup-shaped lower pump housing 46 having an upwardly opened recess is vertically movably disposed below pump housing 9, and lower pump 11 is fitted into the recess of lower pump housing 44. A flange is formed on a top edge of lower pump housing 46, and a coiled spring 47 is interposed between the flange of lower pump housing 46 and a bottom portion of transaxle housing 1 so as to bias lower pump housing 46 upward against lower pump 11.

A vertical cylindrical filter 48 is fixed between pump housing 44 and the bottom portion of transaxle housing 1 so as to surround lower pump 11, lower pump housing 46 and spring 47. Lower pump housing 46 is formed with a vertical through hole serving as a suction duct 46a constantly fluidly connecting lower pump 11 to fluid sump 30 in filter 48. Fluid is supplied from fluid sump 30 to lower pump 11 via filter 48 and suction duct 46a, and is delivered from lower pump 11 to hydraulic valve unit 41 via lower pump delivery duct 14 formed in pump housing 44 and via port tube 17.

If hydraulic actuator 42 fluidly connected to hydraulic valve unit 41 is hydraulically stressed, a delivery pressure of lower pump 11 becomes excessive. At this time, the excessive delivery pressure of lower pump 11 lowers lower pump housing 46 against spring 47, thereby escaping to fluid sump 30. In this way, vertically movable lower pump housing 46 functions as a pressure regulation valve for regulating a hydraulic pressure for operating hydraulic actuator 42.

Incidentally, system 100 in FIG. 1 is not illustrated as having a pressure regulation valve for regulating hydraulic pressure for hydraulic actuator 42, and transaxle T1 in the first embodiment shown in FIGS. 2 to 7 is not provided with such a pressure regulation valve, on an assumption that hydraulic valve Unit 41 includes a pressure regulation valve for regulating hydraulic pressure for hydraulic actuator 42, as understood from the following description of embodiments of hydraulic valve unit 41.

Figure 11:
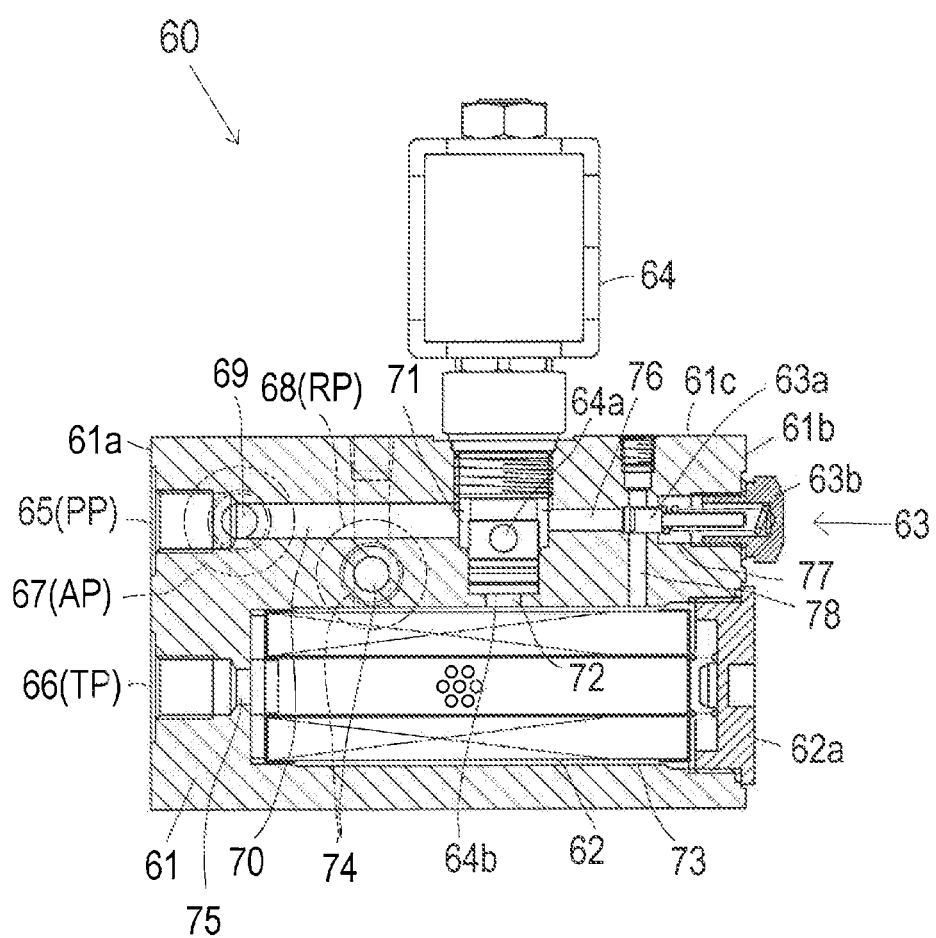
FIG. 11 is a sectional side view of a hydraulic valve unit 60 serving as a hydraulic valve unit 41 according to a first embodiment used for system 100 shown in FIG. 1.
Figure 12:
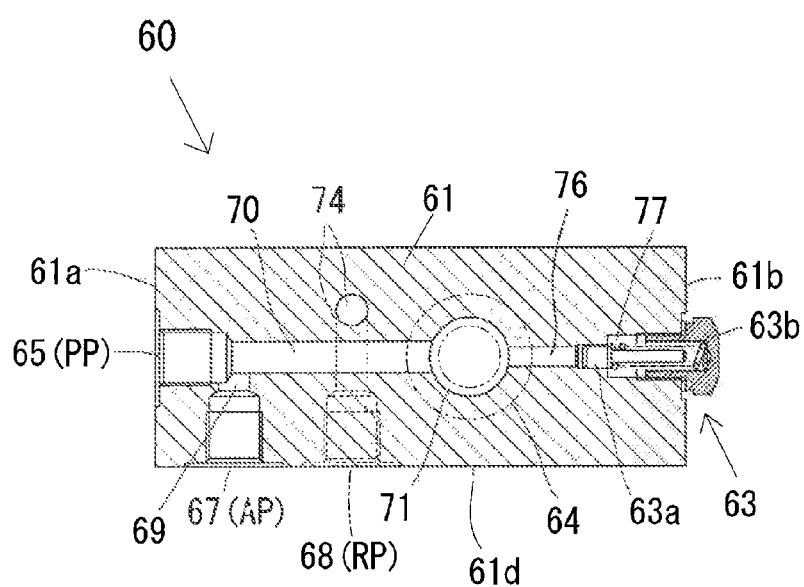
FIG. 12 is a sectional plan view of hydraulic valve unit 60.
Figure 13:
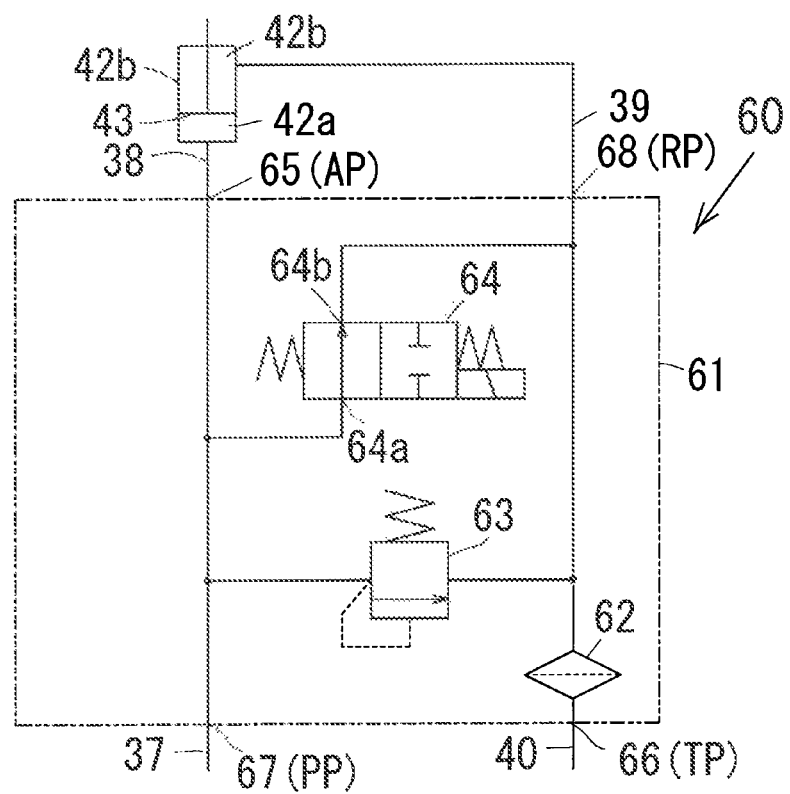
FIG. 13 is a hydraulic circuit diagram of hydraulic valve unit 60.

A hydraulic valve unit 60 serving as a first embodiment of hydraulic valve unit 41 will be described with reference to FIGS. 11 to 13. Referring to FIGS. 11 and 12, hydraulic valve unit 60 includes a rectangular block 61 into which a filter 62, a relief valve 63 and a directional control valve 64 are fitted.

Block 61 has first and second side surfaces 61a and 61b opposite each other, a third side surface 61c extended between first and second side surfaces 61a and 61b, and a fourth side surface 61d extended between first and second side surfaces 61a and 61b and perpendicular to third side surface 61c.

Ports 65 and 66 are opened on first side surface 61a. Port 65 is used as a pump port PP corresponding to port 41a fluidly connected to actuator pump 11 in transaxle housing 1 of transaxle T1 via fluid passage 37. Port 66 is used as a drain (tank) port TP corresponding to port 41d fluidly connected to fluid sump 30 in transaxle housing 1 of transaxle T2 via fluid passage 40.

Ports 67 and 68 are opened on fourth side surface 61d. Port 67 is used as a port (A-port) AP corresponding to port 41b fluidly connected to fluid chamber 42a of hydraulic actuator 42 via fluid passage 38. Port 68 is used as a port (R-port) RP corresponding to port 41c fluidly connected to fluid chamber 42b of hydraulic actuator 42 via fluid passage 39.

A filter chamber 73 and a relief valve chamber 77 are formed in block 61 and are opened on second side surface 61b. A directional control valve chamber 71 is formed in block 61 between pump port 65 (PP) and relief valve chamber 67, and is opened on third side surface 61c. Filter 62, relief valve 63 and directional control valve 64 are fitted into directional control valve chamber 71, 73, and 77 as detailed later.

Alternatively, ports 65 and 67 may be used so that port 65 serves as A-port AP and port 67 serves as pump port PP. In this way, ports 65 and 67 can be used so that one serves as a pump port PP and the other serves as A-port AP, because both ports 65 and 67 are disposed upstream of an input port 64a of directional control valve 64 so that each of ports 65 and 67 can function as either pump port PP or A-port AP, as understood from later description of ducts formed in block 61. The following description of hydraulic valve unit 60 is based on an assumption that port 65 serves as pump port PP, and port 67 serves as A-port AP.

Ducts formed in hydraulic valve unit 60 will be described on an assumption that side surfaces 61a, 61b and 61d are vertical surfaces and side surface 61c is a horizontal top surface. A horizontal duct 70 is extended from port 65 to directional control valve chamber 71. A horizontal duct 69 is branched from duct 70 and is extended to port 67 in perpendicular to duct 70.

Filter chamber 73 is extended below duct 70 in parallel to duct 70. A horizontal duct 75 is coaxially extended from filter chamber 73 to port 66. A vertical duct 72 is extended downward from directional control valve chamber 71 to filter chamber 73. A duct 74 is formed in a portion of pump housing 44 between filter chamber 73 and duct 70 so as to extend horizontally from port 68 and to bend downward to filter chamber 73, thereby fluidly connecting port 68 to fluid chamber 73.

A horizontal duct 76 is extended between directional control valve chamber 71 and relief valve chamber 77. Ducts 70 and 76 are coaxially extended opposite each other with respect to directional control valve chamber 71. A vertical duct 78 is extended downward from relief valve chamber 77 to filter chamber 73.

Cylindrical filter 62 is fitted into filter chamber 73 so as to have a plug 62a plugging the opening of filter chamber 73 on second side surface 61b. Ducts 72, 74 and 78 are fluidly connected to a space of fluid chamber 73 between an outer peripheral surface of filter 62 and an inner peripheral surface of filter chamber 73. On the other hand, duct 75 is fluidly connected to a space of filter chamber 73 surrounded by cylindrical filter 62.

Therefore, fluid introduced to filter chamber 73 via duct 72, 74 or 78 is necessarily filtered by filter 62 before it is discharged from filter chamber 73 to drain port 66 (TP) via duct 65, thereby filtering fluid drained from port 66 (TP) to fluid sump 30 of transaxle T2. Further, fluid introduced into filter chamber 73 via duct 72 or 78 can flow to port 68 (RP) via the space of filter chamber 73 between the outer peripheral surface of filter 62 and the inner peripheral surface of filter chamber 73, thereby supplying fluid to chamber 42b of hydraulic actuator 42.

Relief valve 63 includes a spool valve 63a and a plug 63b. Spool valve 63a is disposed in relief valve chamber 77 so as to be interposed between ducts 76 and 78. Plug 63b is fitted into relief valve chamber 77 so as to cover the opening of relief valve chamber 77 on second side surface 61b. Relief valve 63 serves as a pressure regulation valve for regulating pressure of fluid in ducts 69, 70, 77 and chamber 71, i.e., pressure of fluid on an upstream side of directional control valve 64. In this regard, when the pressure of fluid in duct 77 becomes excessive, spool valve 63a is opened to allow excessive fluid from duct 76 to duct 78. As mentioned above, fluid introduced to filter chamber 73 via duct 78 is drained from drain port 66 (TP) via filter 62 or is supplied to fluid chamber 42b of hydraulic actuator 42 via duct 74 and port 68 (RP).

Directional control valve 64 is fitted into directional control valve chamber 71 so as to plug the opening of directional control valve chamber 71 on third side surface 61c. Directional control valve 64 is an electromagnetic on-off valve having an input port 64a and an output port 64b. Input port 64a is constantly opened to duct 70 via directional control valve chamber 71, and output port 64b is constantly opened to duct 72.

Directional control valve 64 is shiftable between an opening position for fluidly connecting output port 64b to input port 64a and a closing position for isolating output port 64b from input port 64a. When directional control valve 64 is disposed at the opening position as shown in FIG. 13, a part of fluid introduced into pump port 65 (PP) flows to port 67 (AP) via duct 69, and the remaining part of fluid introduced into pump port 65 (PP) is passed to duct 72 via duct 70 and opened valve 64, and may be further passed to duct 68 via duct 76 and opened relief valve 63. As mentioned above, ducts 72 and 78 are fluidly connected to drain port 66 (TP) via filter 62 and duct 65, and are also fluidly connected to port 68 (RP) via filter chamber 73 and duct 74. Therefore, each of ports 67 (AP) and 68 (RP) can be supplied with fluid from pump port 65 (PP) and can drain fluid to drain port 66 (TP).

Here, hydraulic actuator 42 is arranged so that piston 43 tends to move toward fluid chamber 42a, i.e., to reduce the volume of fluid chamber 42a so as to contract piston rod 43a, by gravity or a biasing force. As a result, when directional control valve 64 is disposed at the opening position, fluid introduced into pump port 65 (PP) from fluid passage 37 flows to ports 66 (TP) and 68 (RP) via opened directional control valve 64 (and relief valve 63 when opened) rather than flowing to port A-port 67 (AP), so that fluid is supplied to fluid chamber 42b rather than fluid chamber 42a, thereby moving piston 43 toward fluid chamber 42a by the gravity or the biasing force so as to contract piston rod 43a.

When directional control valve 64 is disposed at the closing position, fluid introduced into port 65 (PP) cannot reach port 66 (TP) or port 68 (RP) excluding the case where fluid is released to duct 68 when relief valve 63 is opened. Therefore, fluid introduced into port 65 (PP) substantially fully flows to port 67 (AP) via duct 69 so as to be supplied to fluid chamber 42a, thereby moving piston 43 toward fluid chamber 42b (to reduce the volume of fluid chamber 42b) so as to extend piston rod 43a. Meanwhile, fluid in fluid chamber 42b is drained to port 68 (RP) via fluid passage 39. Excessive fluid in block 61 is drained to fluid sump 30 of transaxle T2 via filter 62 and drain port 66 (TP).

Figure 14:
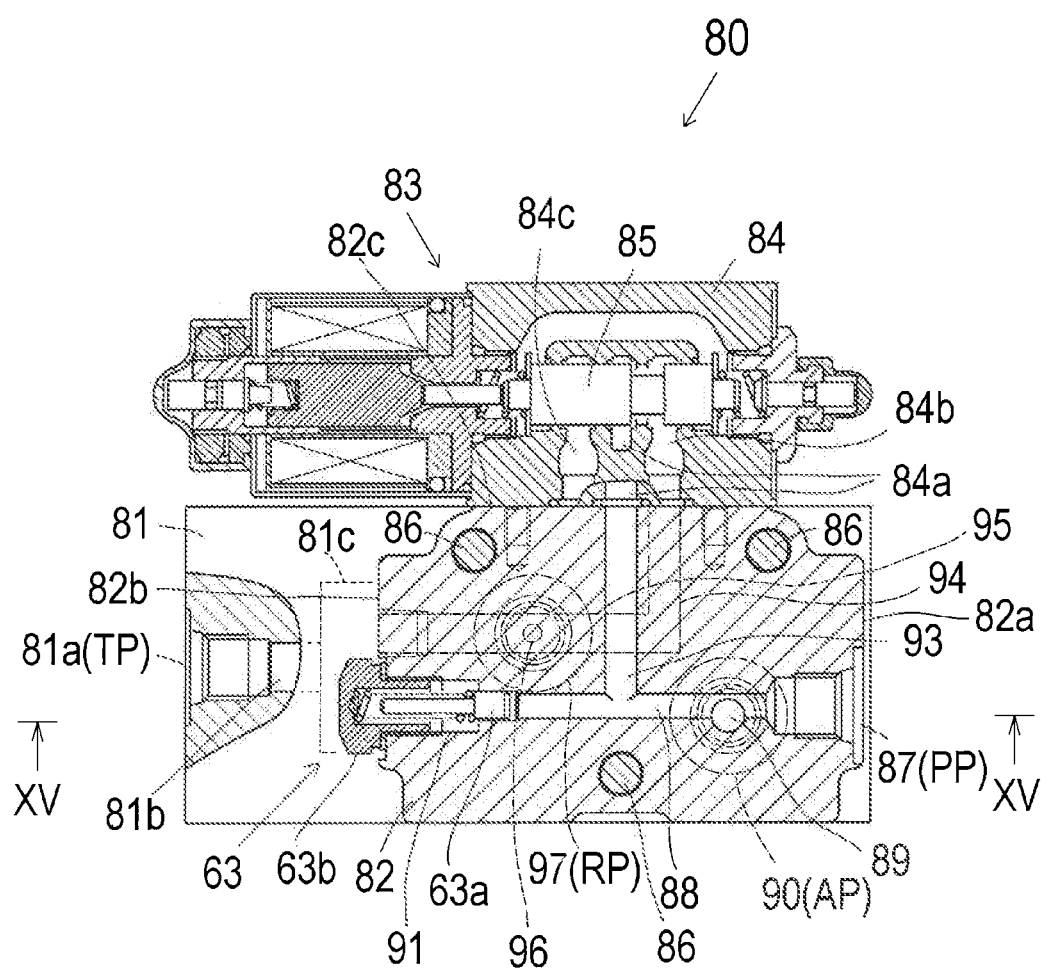
FIG. 14 is a sectional side view of a hydraulic valve unit 80 serving as hydraulic valve unit 41 according to a second embodiment used for system 100 shown in FIG. 1.
Figure 15:
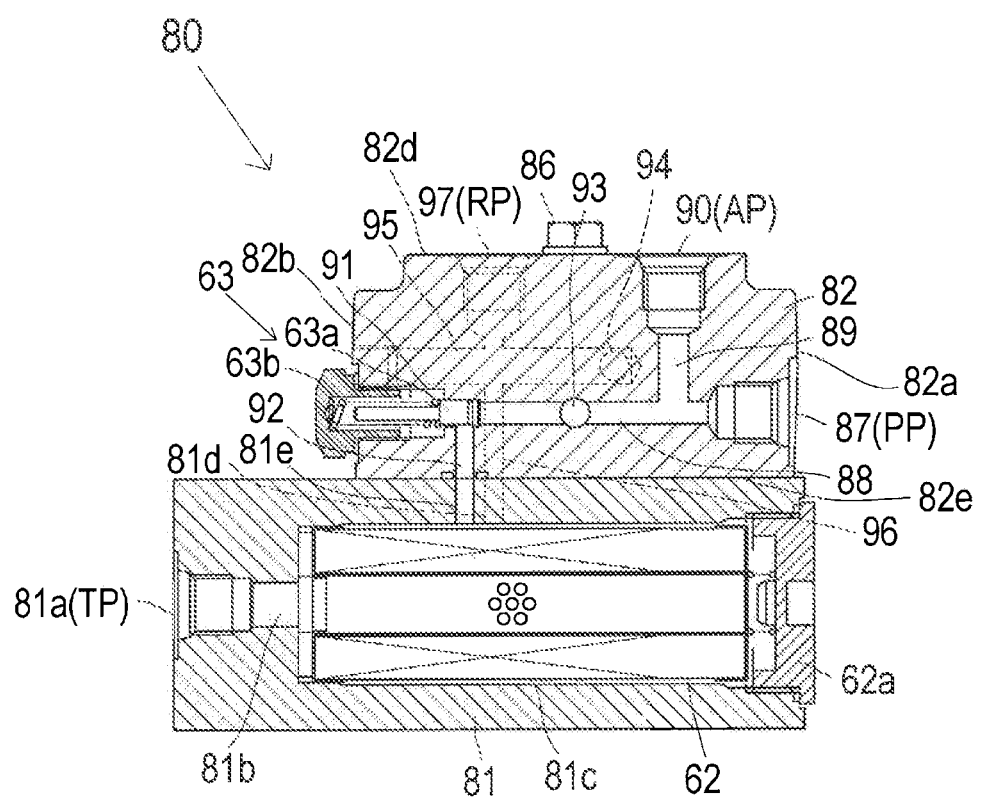
FIG. 15 is a sectional plan view of hydraulic valve unit 80 taken along XV-XV line of FIG. 14.
Figure 16:
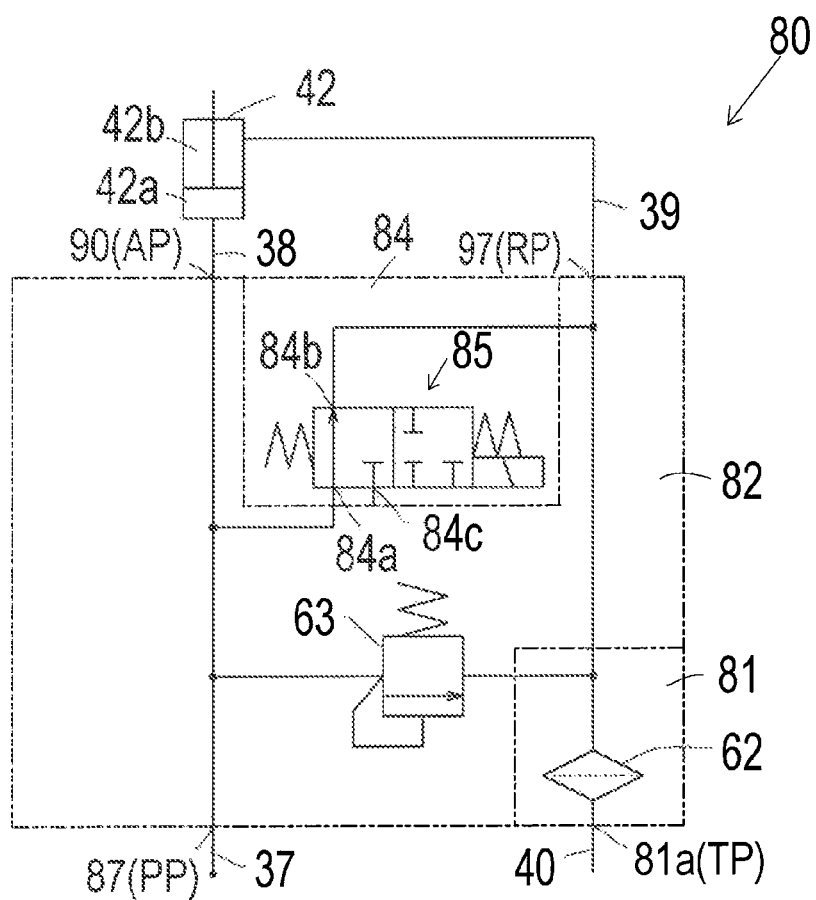
FIG. 16 is a hydraulic circuit diagram of hydraulic valve unit 80.

A hydraulic valve unit 80 serving as a second embodiment of hydraulic valve unit 41 will be described with reference to FIGS. 14 to 16. Referring to FIGS. 14 and 15, hydraulic valve unit 80 includes a rectangular filter block 81 and a rectangular valve block 82 fastened to each other by bolts 86. Cylindrical filter 62 is fitted into filter block 81, and relief valve 63 is fitted into valve block 82. An electromagnetic directional control valve 83 includes a valve block 84 that is joined to valve block 82 having relief valve 63 fitted therein.

A drain (tank) port 81a (TP) is formed in filter block 81 and is opened at one side surface of filter block 81. A filter chamber 81c is formed in filter block 81, and is opened at another side surface of filter block 81 opposite to the side surface having the opening of drain port 81a (TP). Cylindrical filter 62 is fitted into filter chamber 81c via the opening of filter chamber 81c and has plug 62a fitted to filter block 81 so as to plug the opening of filter chamber 81c. A connection duct 81b is formed in filter block 81 so as to fluidly connect a space of filter chamber 81c surrounded by filter 62 to drain port 81a (TP).

Valve block 82 has opposite side surfaces 82a and 82b. A port 87 serving as pump port PP corresponding to port 41a of hydraulic valve unit 41 is opened on side surface 82a, and a relief valve chamber 91 is formed in valve block 81 and is opened on side surface 82b. Valve block 82 has side surfaces 82c, 82d and 82e extended between side surfaces 82a and 82b. Side surfaces 82d and 82e are extended parallel to each other, and side surface 82c is extended between 82d and 82 in perpendicular to side surface 82d and 82e.

Valve block 82 is fixed to directional control valve 83 by joining side surface 82c of valve block 82 to valve block 84 of directional control valve 83. Valve block 82 is joined at side surface 82e to filter block 81. A port 90 serves as A-port AP corresponding to port 41b of hydraulic valve unit 41, a port 97 serves as R-port RP corresponding to port 41c of hydraulic valve unit 41, and ports 90 and 97 are opened on side surface 82d of valve block 82. Alternatively, ports 87 and 90 may be used so that port 87 serves as A-port AP and port 90 serves as pump port PP, because of the same reason as that for ports 65 and 67 of hydraulic valve unit 60.

Hereinafter, side surfaces 82a, 82b, 82d and 82e are assumed to be vertical, and side surface 82c is assumed to be a horizontal top surface of valve block 82. Horizontal ducts 88 and 89 are formed in valve block 82 perpendicular to each other, so that duct 88 is extended from pump port 87 (PP) to relief valve chamber 91, and duct 89 is branched from duct 88 to port 90 (AP) opened on side surface 82d. A vertical duct 93 is formed in valve block 82 so as to extend upward from a portion of horizontal duct 88 between the junction to duct 89 and relief valve chamber 91, and is opened upward on side surface 82c.

A horizontal duct 95 is formed in valve block 82 so as to extend parallel to horizontal duct 88. Horizontal duct 95 is closed at an outer open end thereof on side surface 82b, and has a closed inner end in valve block 82. A vertical duct 94 is formed in valve block 82 so as to extend upward from a portion of horizontal duct 95 adjacent to the closed inner end of duct 95, and is opened upward on side surface 82c.

An input port 84a and an output port 84b are formed in valve block 84, and are opened downward so that input port 84a is fluidly connected to vertical duct 93, and output port 84b is fluidly connected to vertical duct 94. A spool valve 85 of directional control valve 83 is disposed in valve block 84 so as to be interposed between input port 84a and output port 84b. Vertical duct 93 is fluidly connected to input port 84a. Vertical duct 94 is fluidly connected to output port 84b. Spool valve 85 is shiftable between an opening position for fluidly connecting output port 84b to input port 84a and a closing position for isolating output port 84b from input port 84a.

Incidentally, another input port 84c is formed in valve block 84, however, no duct connected to input port 84c is formed in valve block 82. In other words, input port 84c is not used. This is because an inexpensive electromagnetic valve sold on the market, having two input ports and one output port, serves as directional control valve 83 for the purpose of reducing costs.

A horizontal duct 96 is formed in valve block 82 so as to extend from horizontal duct 95 in perpendicular to duct 95, and so as to be opened on side surface 82e, and a horizontal duct 81d is formed in filter block 81 so as to extend from the opening of duct 96 on side surface 82e to filter chamber 81c coaxially to duct 96, thereby fluidly connecting output port 84b of directional control valve 83 to a space of filter chamber 81c between the outer peripheral surface of filter 62 and an inner peripheral surface of filter chamber 81c.

R-port 97 (RP) is extended from duct 95 opposite to duct 96 and is opened on side surface 82d. In this way, output port 84b of directional control valve 83 and R-port 97 (RP) are fluidly connected to each other via ducts 74 and 75, and are fluidly connected to filter chamber 81c via ducts 76 and 81d.

A horizontal duct 92 is formed in valve block 82 so as to extend from relief valve chamber 91 in parallel to duct 96, and so as to be opened on side surface 82e, and a horizontal duct 81e is formed in filter block 81 so as to extend coaxially to duct 92 from the opening of duct 92 on side surface 82e to the space of filter chamber 81c between the outer peripheral surface of filter 62 and the inner peripheral surface of filter chamber 73.

Relief valve 63 has spool valve 63a interposed between duct 88 and duct 92. Therefore, relief valve 63 serves as a pressure regulation valve for regulating pressure of fluid in ducts 88 and 89, chamber 91 and ports 87 (PP) and 90 (AP) at upstream side of spool valve 63a. When the pressure of fluid in duct 88 becomes excessive, spool valve 63a of relief valve 63 is opened to fluidly connect duct 92 to duct 88 via relief valve chamber 71, thereby releasing the excessive fluid to filter chamber 81c.

Hydraulic actuator 42 is assumed as mentioned above so as to have piston 43 tending to move toward fluid chamber 42a by the gravity or the biasing force. When spool valve 85 of directional control valve 83 is disposed at the opening position, fluid introduced into pump port 87 (PP) flows to ports 81a (TP) and 97 (RP) via opened spool valve 85 of directional control valve 83 (and spool valve 63a of relief valve 63 when opened) rather than flowing to A-port 90 (AP), so that piston 43 is moved toward fluid chamber 42a to contract piston rod 43a. When spool valve 85 of directional control valve 83 is disposed at the closing position, fluid introduced into pump port 87 (PP) fully flows to A-port 90 (AP) excluding that spool valve 63a of relief valve 63 is opened to release excessive fluid from duct 88 to port 81a (TP), so that piston 43 is moved toward fluid chamber 42b against the gravity or biasing force so as to extend piston rod 43a.

Figure 17:
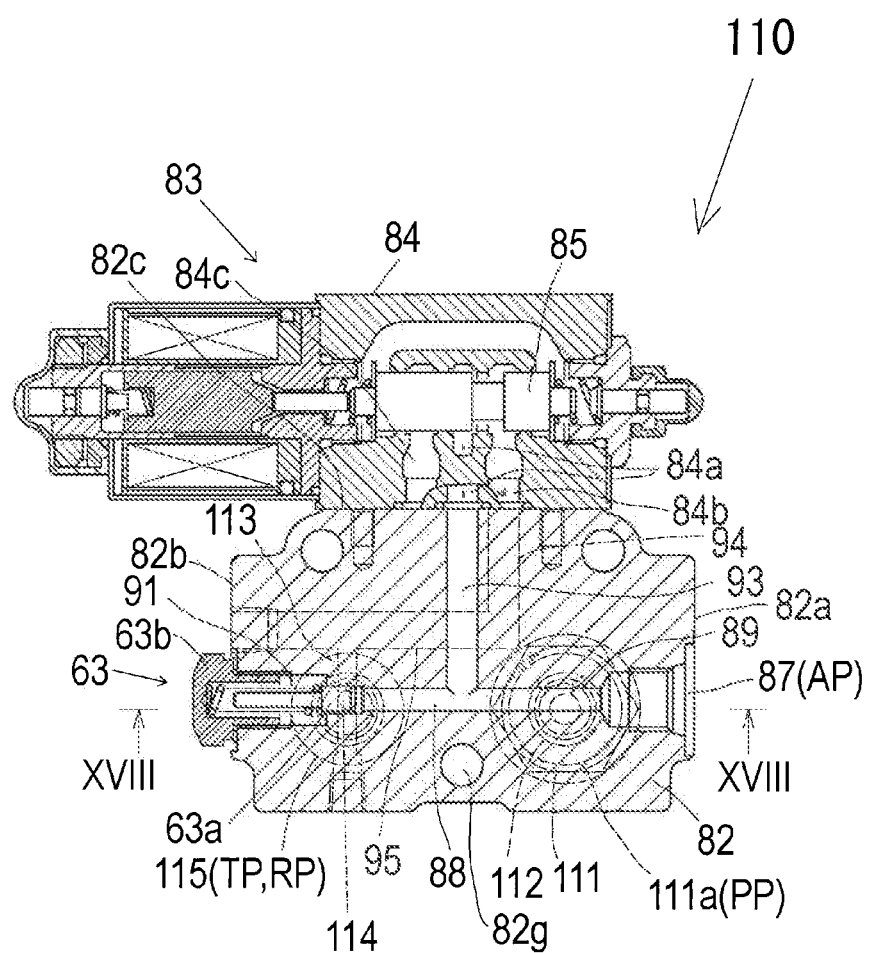
FIG. 17 is a sectional side view of a hydraulic valve unit 110 serving as hydraulic valve unit 41 according to a third embodiment used for system 100 shown in FIG. 1.
Figure 18:
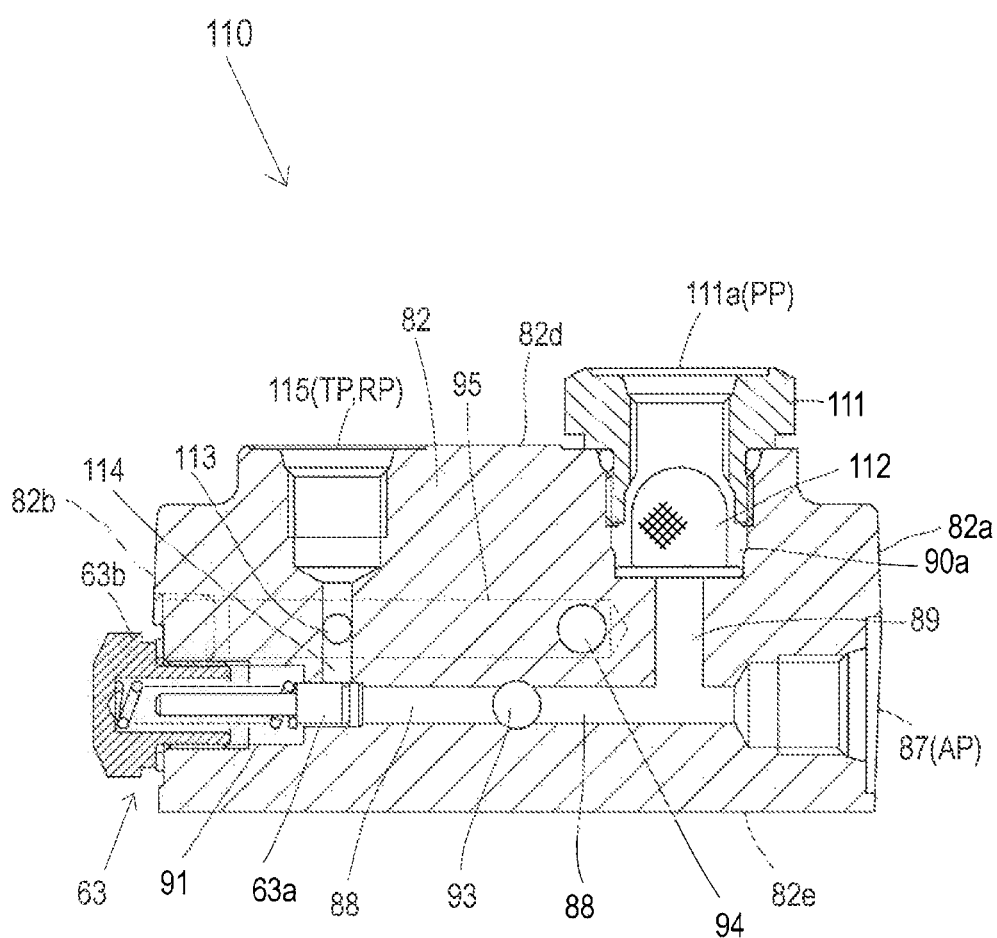
FIG. 18 is a sectional plan view of hydraulic valve unit 110 taken along XVIII-XVIII line of FIG. 17.

A hydraulic valve unit 110 serving as a third embodiment of hydraulic valve unit 41 will be described with reference to FIGS. 17 to 19. Referring to FIGS. 17 and 18, hydraulic valve unit 110 includes rectangular valve block 82 and electromagnetic directional control valve 83 whose valve block 84 is joined to valve block 82. Directional control valve 83 is the same as that of hydraulic valve unit 80. Valve block 82 is the same as that of hydraulic valve unit 80 excluding that ducts and ports in valve block 82 of hydraulic valve unit 110 are partly different from those in valve block 82 of hydraulic valve unit 80.

Further, valve block 82 of hydraulic valve unit 110 has a filter 112 fitted therein instead of filter block 81 with filter 62 used in hydraulic valve unit 80. In this regard, no bolt for fastening valve block 82 to filter block 81 is inserted into each of bolt holes 82g fanned in valve block 82.

The following description of hydraulic valve unit 110 will be based on the assumption that side surfaces 82a, 82b, 83d, 82e of valve block 82 are vertical, and side surface 82c is the horizontal top surface of valve block 82 joined to valve block 84 of directional control valve 83.

Similar to valve block 82 of hydraulic valve unit 80, valve block 82 of hydraulic valve unit 110 is provided therein with port 87, relief valve chamber 91, horizontal duct 88 extended between port 87 and chamber 91, relief valve 63 fitted in relief valve chamber 91, horizontal duct 89 branching from duct 88, vertical ducts 93 and 94 fluidly connected to input and output ports 84a and 84b of directional control valve 83, and horizontal duct 95 extended from duct 94. Therefore, valve block 82 having these ducts and chamber can be standardized to be shared between hydraulic valve units 80 and 110.

A filter chamber 90a is formed in valve block 82 of hydraulic valve unit 110 so as to extend from duct 89, and so as to be opened on side surface 82d, thereby corresponding to expanded port 90 of hydraulic valve unit 80. Hemispherical filter 112 is disposed in filter chamber 90a, and a port plug 111 is fitted to valve block 82 so as to plug the opening of filter chamber 90a on side surface 82c and so as to cover filter 112 in filter chamber 90a. An outwardly opened port 111a is formed in port plug 111 so as to be fluidly connected to filter chamber 90a. Port 111a serves as pump port PP corresponding to port 41a of hydraulic valve unit 41. In association with port 111a serving as pump port PP, port 87 of hydraulic valve unit 110 opened on side surface 82a serves as A-port AP corresponding to port 41b of hydraulic valve unit 41.

Figure 19:
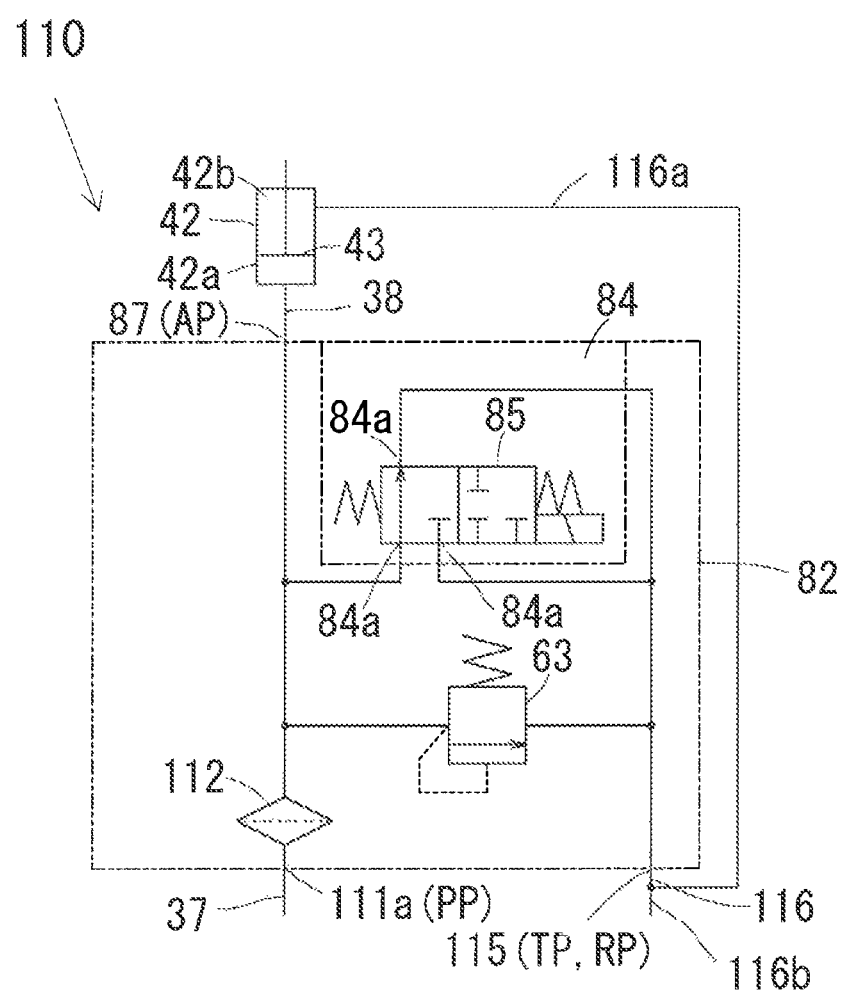
FIG. 19 is a hydraulic circuit diagram of hydraulic valve unit 110.

Therefore, as understood from the hydraulic circuit of FIG. 19, hydraulic valve unit 110 is configured to filter fluid by filter 112 immediately after the fluid is introduced into pump port 111a (PP) before the fluid is supplied to A-port 87 (AP), relief valve 63 or directional control valve 83, in comparison with hydraulic valve units 60 and 80 each of which has filter 62 for filtering fluid immediately before it is drained from drain port TP.

Alternatively, port 87 opened on side surface 82a may be modified to have filter 112 and port plug 111 so as to serve as pump port PP while unmodified port 90 opened on side surface 82d serves as A-port AP because of the same reason for the fact that each of ports 87 and 90 can be used as either pump port PP or A-port AP.

A port 115 is formed in valve block 82 and is opened on side surface 82d. A horizontal duct 114 is extended from relief valve chamber 91 to port 115 in perpendicular to horizontal duct 88 and in parallel to duct 89. Therefore, when relief valve 63 is opened, relief valve 63 discharges excessive fluid from duct 88 to port 115 via relief valve chamber 91 and duct 114.

Further, a vertical duct 113 is extended downward from duct 95 and is connected at a bottom thereof to duct 114. Therefore, when directional control valve 83 is opened to fluidly connect output port 84b to input port 84a, directional control valve 83 discharges fluid from output port 84b to port 115 via ducts 94, 95 and 114.

Therefore, port 115 serves as both R-port RP and drain port TP corresponding to ports 41c and 41d of hydraulic valve unit 41. In this regard, as shown in FIG. 19, a pipe serving as a fluid passage 116 is connected to port 115, and fluid passage 116 is bifurcated to fluid passages 116a and 116b. Fluid passage 116a is fluidly connected to fluid chamber 42b of hydraulic actuator 42 so as to serve as fluid passage 39 interposed between fluid chamber 42b and R-port RP. Fluid passage 116b is extended to fluid sump 30 of transaxle T2 so as to serve as fluid passage 40 interposed between fluid sump 30 of transaxle T2 and drain port TP.

On the above-mentioned assumption that piston 43 tends to move toward fluid chamber 42a by the gravity or biasing force, when directional control valve 83 is set at the opening position to fluidly connect output port 84b to input port 84a, fluid introduced into pump port 111a and filtered by filter 113 flows to port 115 (TP, RP) via ducts 73, 74, 75 and 114 and opened directional control valve 83 rather than flowing to A-port 87 (AP). Therefore, fluid is supplied to fluid chamber 42b rather than fluid chamber 42a so as to move piston 43 toward fluid chamber 42a, thereby contracting piston rod 43a.

When directional control valve 83 is set at the closing position to isolate output port 84b from input port 84a, fluid introduced into pump port 111a and filtered by filter 113 fully flows to A-port 87 (AP) to be supplied to fluid chamber 42a of hydraulic actuator 42 so as to extend piston rod 43a, excluding that relief valve 63 releases excessive fluid in duct 88 to port 115 (TP, RP).

Figure 8:
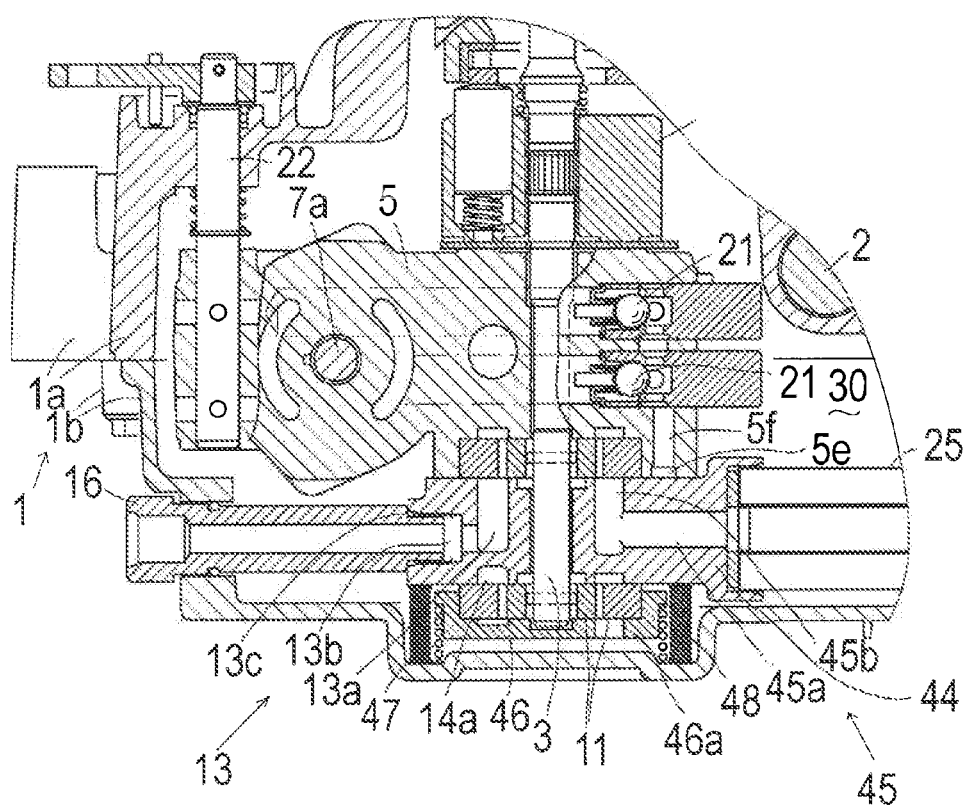
FIG. 8 is a fragmentary sectional side view of a hydraulic transaxle serving as first hydraulic transaxle T1 according to a second embodiment used in system 100 shown in FIG. 1, corresponding to FIG. 2 of the hydraulic transaxle according to the first embodiment.
Figure 9:
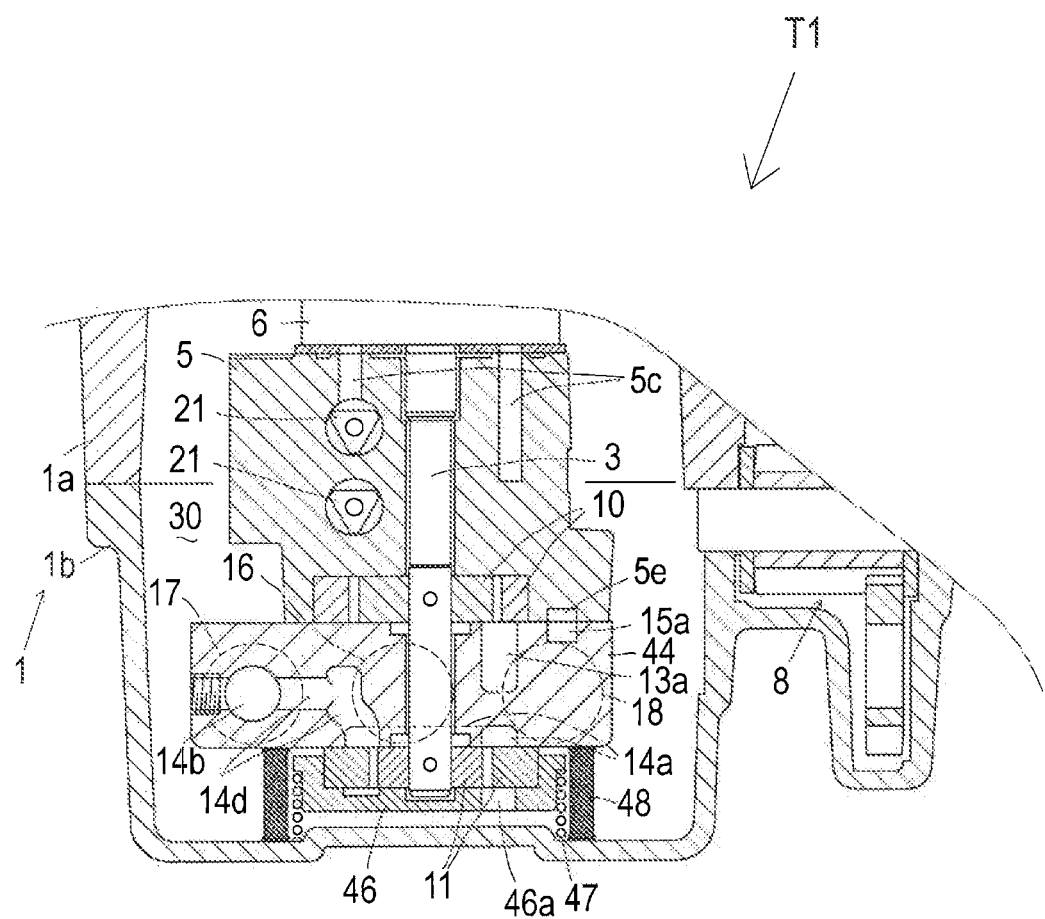
FIG. 9 is a fragmentary sectional front view of the hydraulic transaxle shown in FIG. 8, corresponding to FIG. 3 of the hydraulic transaxle according to the first embodiment.
Figure 10:
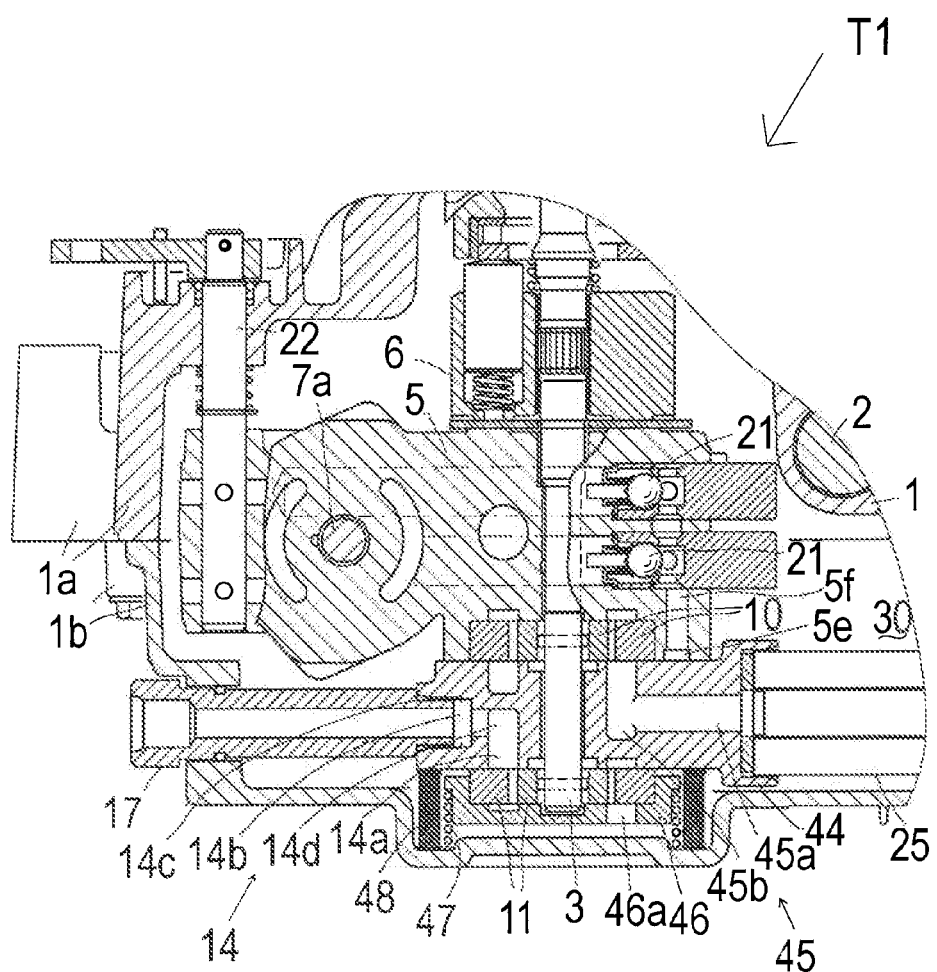
FIG. 10 is a fragmentary developed sectional side view of the hydraulic transaxle shown in FIGS. 8 and 9, corresponding to FIG. 6 of the hydraulic transaxle according to the first embodiment.

Alternatively, when transaxle T1 employs actuator pump 11 supported by lower pump housing 46 as shown in FIGS. 8 to 10, relief valve 63 serving as the pressure regulation valve for hydraulic actuator 42 can be removed from each of hydraulic valve units 60, 80 and 110 serving as hydraulic valve unit 41, because lower pump housing 46 functions as a relief valve serving as the pressure regulation valve for hydraulic actuator 42. Further, in this case, block 61 of hydraulic valve unit 60 or valve block 82 of hydraulic valve unit 80 or 110 can be simplified because it does not need any duct or chamber for relief valve 63.

Figure 20:
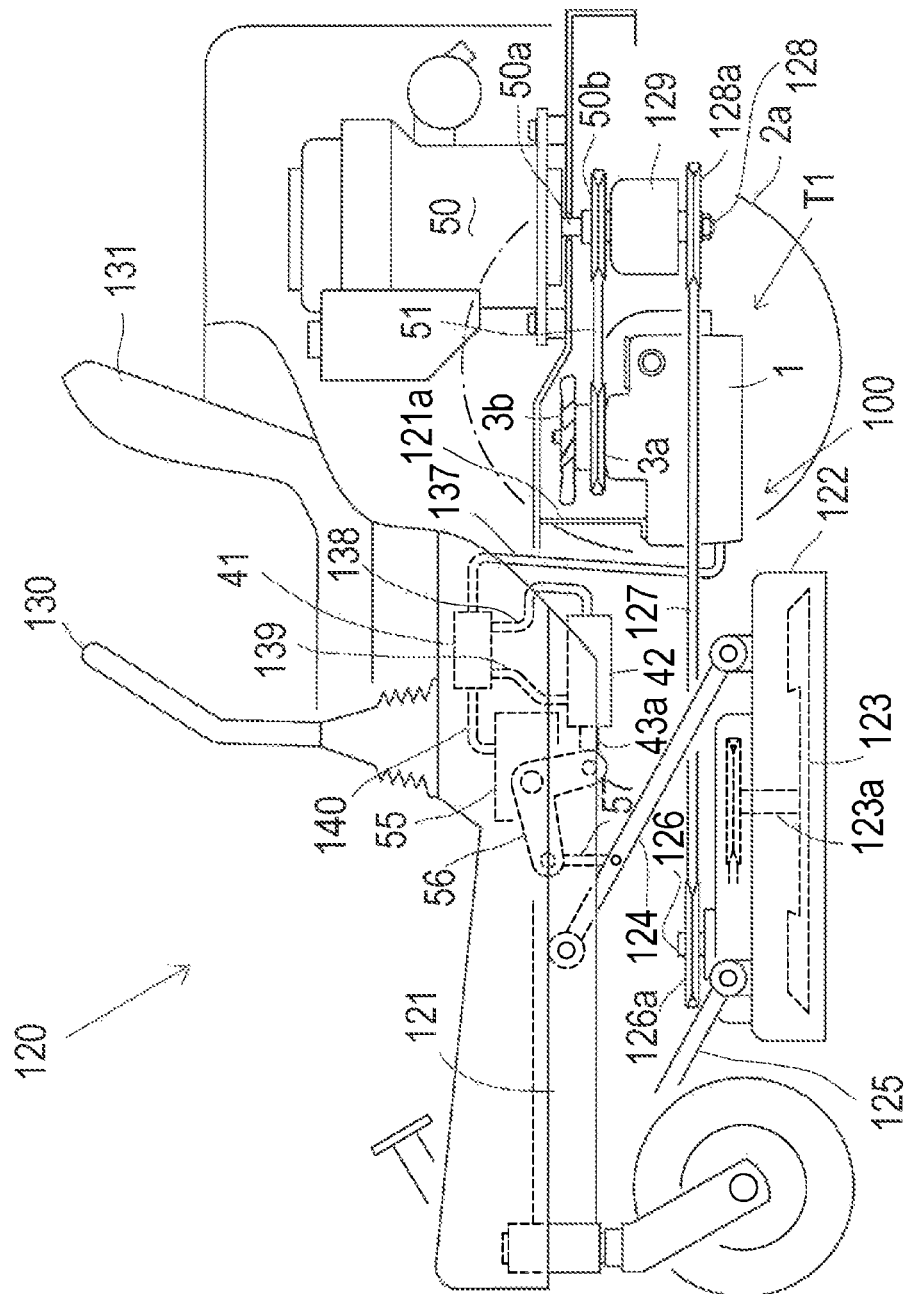
FIG. 20 is a schematic side view of a lawn mower 120 provided with hydraulic zero-turn vehicle driving system 100 shown in FIG. 1

A lawn mower 120 provided with hydraulic zero-turn vehicle driving system 100 as shown in FIG. 1 will be described with reference to FIG. 20. Lawn mower 120 includes a vehicle frame 121, and a sub frame 121a is extended downward from vehicle frame 121 so as to be fixed at a bottom thereof to transaxle housings 1 of right and left hydraulic transaxles carrying respective right and left drive wheels 2a, so that the right and left hydraulic transaxles are disposed below vehicle frame 121. At least one of these right and left hydraulic transaxles is transaxle T1 including auxiliary pumps 10 and 11 so as to enable fluid supply to a hydraulic actuator. In FIG. 20, only transaxle T1 serving as the right hydraulic transaxle is illustrated, and the left hydraulic transaxle is omitted. The other hydraulic transaxle may be either transaxle T1 including auxiliary pumps 10 and 11 or transaxle T2 including only one auxiliary pump 10. Pipes (not shown) are interposed between transaxle housings 1 of the right and left transaxles so as to supply fluid delivered from auxiliary pump 10 of each hydraulic transaxle to the other hydraulic transaxle.

Engine 50 is mounted upward from vehicle frame 121. Engine output shaft 50a of engine 50 is extended vertically downward from vehicle frame 121 so as to be disposed rearward from the right and left transaxles. Engine output pulley 50b is fixed on engine output shaft 50a. Input pulleys 3a are fixed on the top portions of pump shafts 3 projecting upward from transaxle housings 1 of the right and left hydraulic transaxles including transaxle T1. Belt 51 is looped over pulley 50b and the two pulleys 3a so as to transmit power of engine 50 to pump shafts 3 of the right and left hydraulic transaxles.

An operator's seat 131 is mounted upward from vehicle frame 121, and right and left control levers 130 (only one is shown in FIG. 20) are provided adjacent to seat 131. Control levers 130 are operatively connected to respective movable swash plates 6a of hydraulic pumps 6.

A mower deck 122 is disposed in a space forward from transaxle housings 1 of the right and left hydraulic transaxles and below vehicle frame 121. A rotary mowing blade 123 is disposed in mower deck 122. In mower deck 122, a vehicle drive shaft 123a of rotary mowing blade 123 is drivingly connected to a vertical input shaft 126 supported by mower deck 122 via a belt and pulleys or the like. A top portion of input shaft 126 projects upward from mower deck 122, and an input pulley 126a is fixed on this top portion of input shaft 126.

Engine output shaft 50a is extended downward from engine output pulley 50b, and is inserted into a clutch housing 129. A vertical clutch shaft 128 is extended downward from clutch housing 129. A clutch (not shown) is disposed in clutch housing 129 and is interposed between engine output shaft 50a and clutch shaft 128. A pulley 128a is fixed on clutch shaft 128 below clutch housing 129, and a belt 127 is looped over pulley 128a and input pulley 126a so as to transmit power of engine 50 to rotary mowing blade 123 in mower deck 122. Incidentally, belt 127 can be passed through a space between right and left transaxle housings 1.

Link rods 124 and 125 are extended downward from vehicle frame 121 so as to constitute a parallel linkage suspending mower deck 122. Link rods 124 and 125 have an angle from vehicle frame 121, so that mower deck 122 has a variable height that can be changed by changing the angle of link rods 124 and 125. An L-shaped arm 56 is pivoted at a bending portion thereof onto vehicle fame 121. Arm 56 is pivotally connected at one end thereof to link rod 124, and is pivotally connected at the other end thereof to a tip of piston rod 43a of hydraulic cylinder 42 serving as the hydraulic actuator for lifting, i.e., raising and lowering mower deck 122. Arm 56 is rotated centered on the pivot at the bending portion thereof according to telescopic movement of piston rod 43a of hydraulic cylinder 42 so as to change the angle of link rods 124 and 125 from vehicle frame 121.

Hydraulic valve unit 41 is disposed adjacent to hydraulic cylinder 42. Pipes 138 and 139 serving as fluid passages 38 and 39 are interposed between respective ports 41b and 41c (AP and PP) of hydraulic valve unit 41 and respective ports of hydraulic cylinder 42 opened to respective fluid chambers 42a and 42b. A pipe 137 serving as the external portion of fluid passage 37 outside of transaxle housings 1 is interposed between transaxle housing 1 of transaxle T1 (more specifically, the outer end of port tube 17 provided on transaxle housing 1) and pump port 41a (PP) of hydraulic valve unit 41. A pipe 140 serving as fluid passage 40 is extended from drain port 41d (TP) of hydraulic valve unit 41, however, pipe 140 is not connected to transaxle housing 1 of the other hydraulic transaxle as shown in FIG. 1, but is connected to a fluid tank 55 disposed separately from transaxle housings 1 of the right and left hydraulic transaxles. Incidentally, fluid tank 55 may serve as reservoir 52 shown in FIG. 1, which can absorb fluid from transaxle housings 1.

It is further understood by those skilled in the art that the foregoing description is given of preferred embodiments of the disclosed apparatus and that various changes and modifications may be made in the invention without departing from the scope thereof defined by the following claims.

What is claimed is:

1. A hydraulic transaxle comprising:
 a transaxle housing defining a fluid sump therein;
 an axle supported by the transaxle housing;
 a hydraulic motor disposed in the transaxle housing so as to drive the axle;
 a hydraulic pump disposed in the transaxle housing so as to supply hydraulic fluid to the hydraulic motor;
 a hydraulic circuit disposed in the transaxle housing so as to fluidly connect the hydraulic pump to the hydraulic motor; and
 a pair of auxiliary pumps disposed in the transaxle housing so as to supply fluid from the fluid sump to outside of the transaxle housing.

2. The hydraulic transaxle according to claim 1, wherein the hydraulic transaxle serves as a first hydraulic transaxle,
 wherein one of the auxiliary pumps serves as a charge pump for supplying fluid from the fluid sump in the transaxle housing of the first hydraulic transaxle into a transaxle housing of a second hydraulic transaxle, and
 wherein the other of the auxiliary pumps serves as an actuator pump for supplying fluid from the fluid sump in the transaxle housing of the first hydraulic transaxle to a hydraulic actuator disposed outside of the transaxle housings of the first and second hydraulic transaxles.

3. The hydraulic transaxle according to claim 2, wherein a vehicle is equipped with the first and second hydraulic transaxles and a mower deck, and
 wherein the hydraulic actuator is provided for lifting the mower deck.

4. The hydraulic transaxle according to claim 2, further comprising:
 a hydraulic valve disposed outside of the transaxle housings of the first and second hydraulic transaxles so as to fluidly connect the hydraulic actuator to the actuator pump.

5. The hydraulic transaxle according to claim 4, wherein the transaxle housing of the second hydraulic transaxle defines a fluid sump therein, and
 wherein the hydraulic valve is fluidly connected to the fluid sump in the transaxle housing of the second hydraulic transaxle.

6. The hydraulic transaxle according to claim 1, further comprising:
 a pump housing supporting the auxiliary pumps,
 wherein the pump housing includes a suction duct and a pair of delivery ducts, and
 wherein the pump housing is disposed in the transaxle housing so as to supply fluid from the fluid sump to the auxiliary pumps via the suction duct, and so as to deliver fluid from the auxiliary pumps to the outside of the transaxle housing via the respective delivery ducts.

7. The hydraulic transaxle according to claim 6, wherein the suction duct serves as a first suction duct, and
 wherein the pump housing has a second suction duct fluidly connected to the hydraulic circuit so as to supply fluid from the outside of the transaxle housing to the hydraulic circuit.

8. The hydraulic transaxle according to claim 7, wherein the hydraulic transaxle serves as a first hydraulic transaxle,
 wherein one of the auxiliary pumps serves as a charge pump for supplying fluid from the fluid sump in the transaxle housing of the first hydraulic transaxle into a transaxle housing of a second hydraulic transaxle via one of the delivery ducts,
 wherein the other of the auxiliary pumps serves as an actuator pump for supplying fluid from the fluid sump in the transaxle housing of the first hydraulic transaxle to a hydraulic actuator disposed outside of the transaxle housings of the first and second hydraulic transaxles via the other of the delivery ducts, and
 wherein the second suction duct is fluidly connected to the transaxle housing of the second hydraulic transaxle so as to supply fluid from the transaxle housing of the second hydraulic transaxle to the hydraulic circuit in the transaxle housing of the first hydraulic transaxle.

9. The hydraulic transaxle according to claim 8, further comprising:
- a center section having the hydraulic pump and the hydraulic motor mounted thereon so as to define the hydraulic circuit between the hydraulic pump and the hydraulic motor,
- wherein the center section is disposed in the transaxle housing of the first hydraulic transaxle and is connected to the pump housing so as to fluidly connect the hydraulic circuit to the second suction duct.

10. The hydraulic transaxle according to claim 6, wherein an input shaft of the hydraulic pump is extended into the pump housing so as to drive the auxiliary pumps.

11. The hydraulic transaxle according to claim 10, wherein the auxiliary pumps are disposed opposite each other in an axial direction of the input shaft of the hydraulic pump, and
- wherein the suction duct has an opening that opens outward to the fluid sump at a position on the pump housing between the auxiliary pumps in the axial direction of the input shaft of the hydraulic pump, and bifurcates in the pump housing to the auxiliary pumps.

12. The hydraulic transaxle according to claim 10, wherein the suction duct has an opening at a side of the pump housing, and
- wherein the delivery ducts have respective openings at another side of the pump housing opposite to the suction duct with respect to the input shaft of the hydraulic pump.

13. The hydraulic transaxle according to claim 6, the pump housing serving as a first pump housing, further comprising:
- a second pump housing disposed in the transaxle housing so as to have one of the auxiliary pumps mounted thereon, wherein the second pump housing is movable away from the auxiliary pump mounted on the second pump housing according to an increase of a pressure of fluid delivered from the auxiliary pump mounted on the second pump housing; and
- a biasing member disposed in the transaxle housing so as to bias the second pump housing toward the auxiliary pump mounted on the second pump housing against the pressure of fluid delivered from the auxiliary pump mounted on the second pump housing.

* * * * *